(12) United States Patent
Nagasuna et al.

(10) Patent No.: US 6,395,792 B1
(45) Date of Patent: May 28, 2002

(54) METHOD FOR PRODUCTION OF POROUS CROSS-LINKED POYMER

(75) Inventors: Kinya Nagasuna, Kitakatsuragi; Hirotama Fujimaru, Suita; Kenji Kadonaga, Takatsuki; Kozo Nogi, Kakogawa; Katsuhiko Sakamoto, Takatsuki; Masazumi Sasabe, Kakogawa; Kenji Minami, Otsu, all of (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 09/689,350

(22) Filed: Oct. 12, 2000

(30) Foreign Application Priority Data

Oct. 12, 1999 (JP) .......................................... 11-290141

(51) Int. Cl.⁷ .................................................. C08J 9/28
(52) U.S. Cl. ............................................. 521/64; 521/63
(58) Field of Search ...................................... 521/64, 63

(56) References Cited

U.S. PATENT DOCUMENTS

| | | | |
|---|---|---|---|
| 4,522,953 A | | 6/1985 | Barby et al. .................. 521/64 |
| 4,788,225 A | | 11/1988 | Edwards et al. ............ 521/147 |
| 5,189,070 A | | 2/1993 | Brownscombe et al. ...... 521/64 |
| 5,210,104 A | | 5/1993 | Bass et al. ..................... 521/64 |
| 5,252,619 A | | 10/1993 | Brownscombe et al. ...... 521/64 |
| 5,670,101 A | * | 9/1997 | Nathoo et al. ............. 264/45.8 |
| 6,187,828 B1 | * | 2/2001 | Woodrum ..................... 521/64 |
| 6,204,298 B1 | * | 3/2001 | DesMarais et al. ........... 521/64 |

FOREIGN PATENT DOCUMENTS

| | | | |
|---|---|---|---|
| DE | 3208369 A1 | 9/1983 | ............. C08F/2/48 |
| JP | 57-198713 | 12/1982 | ......... C08F/212/08 |
| JP | 62-250002 | 10/1987 | ............. C08F/2/12 |
| WO | WO 97/27240 | 7/1997 | ............. C08J/9/28 |

\* cited by examiner

Primary Examiner—Morton Foelak
(74) Attorney, Agent, or Firm—Fish & Richardson P.C.

(57) ABSTRACT

An object of this invention is to provide a method for the production of a porous cross-linked polymer, which permits the polymerization (curing) of a water in oil type high internal phase emulsion (HIPE) in such an exceptionally brief time as not more than 30 minutes, preferably not more than 10 minutes without impairing the stability of the HIPE. The object of this invention mentioned above can be accomplished by a method for the production of a porous cross-linked polymer which comprises steps of mixing an oil phase containing a polymerizing monomer, a cross-linking monomer, and a surfactant as essential components with a water phase containing water as an essential component thereby obtaining a water in oil type high internal phase emulsion and heating said emulsion to a prescribed curing temperature thereby polymerizing the emulsion, wherein said emulsion is formed in a thickness of not more than 50 mm and the temperature-increasing rate of the emulsion is not less than 5° C./minute.

13 Claims, 1 Drawing Sheet

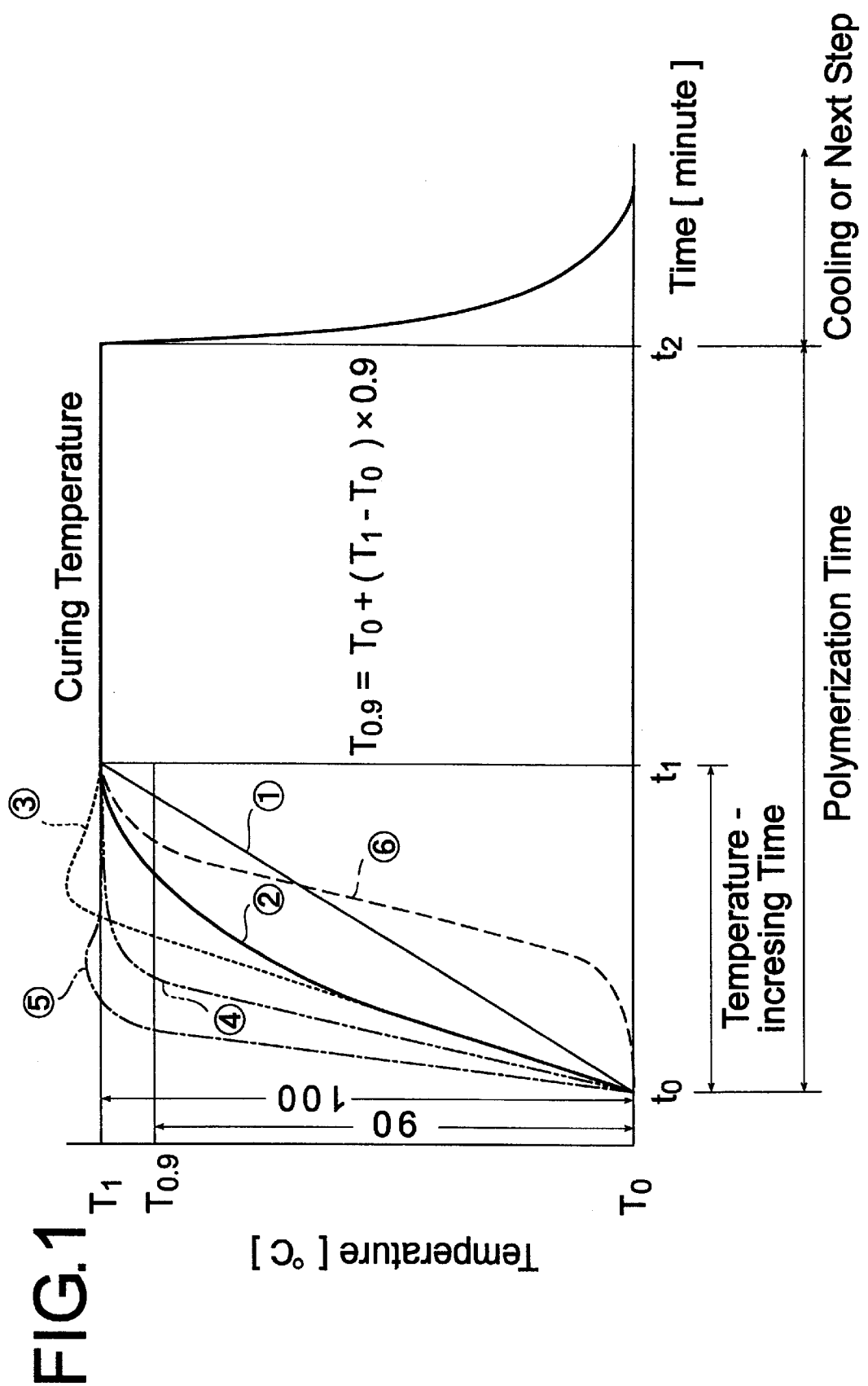

METHOD FOR PRODUCTION OF POROUS CROSS-LINKED POYMER

TECHNICAL FIELD

This invention, in the production of a porous cross-linked polymer forming continuous pores in the surface and the interior thereof and consequently possessing continued cells (hereinafter occasionally referred to as "open cells") by polymerizing a water in oil type high internal phase emulsion (hereinafter occasionally referred to briefly as "HIPE"), relates to a method for producing the porous cross-linked polymer by curing the HIPE in a very brief time. More particularly, this invention relates to a method for the production of a porous cross-linked polymer containing open cells and finding extensive utility in such applications as (1) liquid absorbent materials such as, for example, ① core materials in disposable diapers to be used for absorbing body fluid such as urine and blood and ② agents for waste water and waste oil disposal and agents for water solvent disposal to be used for absorbing water, aqueous liquid, oil, and organic solvents, (2) energy absorbent materials such as, for example, sound insulating materials and heat insulators in automobiles and buildings to be used for absorbing sound and heat, and (3) chemical impregnating substrates such as, for example, household products impregnated with aromatic agents, detergents, lustering agents, surface protecting agents, and flame-retarding agents.

BACKGROUND ART

The term "HIPE" refers to an emulsion which has a water phase as a dispersion phase (internal phase) and an oil phase as an external phase at a ratio (W/O ratio) of not less than about 3/1. The fact that a porous cross-linked polymer is produced by polymerizing this HIPE has been known to the art.

While the porous cross-linked polymer which is produced by using a foaming agent without preparing the HIPE readily constitutes itself a foam of discrete cells of a comparatively large diameter, the method for producing the porous cross-linked polymer from the HIPE (hereinafter occasionally referred to simply as "HIPE method") excels as a process for the manufacture of a low-density foam of open cells of a minute diameter.

Methods for producing a porous cross-linked polymer from the HIPE are disclosed, for example, in JP-A-57-198,713, JP-A-62-250,002, U.S. Pat. Nos. 5,252,619, and 5,189,070.

In JP-A-57-198,713 and JP-A-62-250,002, a method which comprises preparing a HIPE containing a water-soluble and/or oil-soluble polymerization initiator and thermally polymerizing this HIPE at 50° C. or 60° C. for a period in the range of 8 hours to 72 hours has been disclosed. Then, U.S. Pat. No. 5,210,104 discloses a method which comprises adding a polymerization initiator after preparing a HIPE, U.S. Pat. No. 5,252,619 a method which comprises preparing a HIPE containing a polymerization initiator and then polymerizing the HIPE at a temperature of not less than 90° C., and U.S. Pat. No. 5,089,070 a method which comprises forming a gel possessing a prescribed modulus of elasticity in shear from an emulsion at a temperature in the range of 20–65° C. and thereafter polymerizing the gel at a temperature of not less than 70° C.

The methods which are disclosed in JP-A-57-198,713 and JP-A-62-250,002, however, require a long time for the polymerization and suffers from poor efficiency of production. When the polymerization is performed at high temperatures as disclosed in U.S. Pat. Nos. 5,252,619 and 5,189,070, the polymerization requires a period totaling several hours and, depending on the conditions, tends to impair the stability of the HIPE and induce liberation of a large amount of water, and possibly fails to obtain a porous cross-linked polymer possessing a stated pore diameter. U.S. Pat. No. 5,210,104 has a mention to the effect that the polymerization requires several hours notwithstanding the HIPE is emulsified with improved stability owing to the addition of a polymerization initiator after the preparation of the HIPE.

It is, therefore, an object of this invention to solve the technical problems enumerated above and to provide a method for the production of a porous cross-linked polymer which enables the HIPE to be polymerized (cured) in an exceptionally brief time of not more than 30 minutes, preferably not more than 10 minutes, for example, without impairing the stability of the HIPE.

DISCLOSURE OF THE INVENTION

The present inventors, after pursuing a diligent study in search of a method for the production of a porous cross-linked polymer in a very brief time by the HIPE method, have discovered that when a HIPE is formed in a comparatively small thickness falling in a specific range and the HIPE of this thickness is heated at a specific temperature-increasing rate until reaching a target curing temperature and then cured, the liberation of water observed during the cure at the conventional increased temperature is not observed at all and a porous cross-linked polymer of an uniform thickness can be obtained and this porous cross-linked polymer excels in absorption properties. This invention has been perfected as a result.

To be specific, the object mentioned above is accomplished by the following items (1)–(13).

(1) In the production of a porous cross-linked polymer by the steps of mixing an oil phase containing a polymerizing monomer, a cross-linking monomer, and a surfactant as essential components and a water phase containing water as an essential component thereby obtaining a water in oil type high internal phase emulsion and heating this emulsion till a prescribed curing temperature thereby polymerizing the emulsion, a method for the production of the porous cross-linked polymer characterized by forming the emulsion in a thickness of not more than 50 mm and heating the emulsion at a temperature-increasing rate of not less than 5° C./minute.

(2) In the production of a porous cross-linked polymer by the steps of mixing an oil phase containing a polymerizing monomer, a cross-linking monomer, and a surfactant as essential components and a water phase containing water as an essential component thereby obtaining a water in oil type high internal phase emulsion and heating this emulsion till a prescribed curing temperature thereby polymerizing the emulsion, a method for the production of the porous cross-linked polymer characterized by forming the emulsion in the shape of a film or a sheet and heating the emulsion at a temperature-increasing rate of not less than 5° C./minute.

(3) A method set forth in (1) or (2) above, wherein the temperature-increasing rate in the heating of the emulsion is in the range of 5–60° C./minute.

(4) A method set forth in any of (1)–(3) above, wherein the difference between the forming temperature of the emulsion and the curing temperature of the emulsion is in the range of 2–50° C.

(5) A method set forth in any of (1)–(4) above, wherein the forming temperature of the emulsion is in the range of 40–95° C.

(6) A method set forth in any of (1)–(5) above, wherein the curing temperature of the emulsion is in the range of 80–110° C.

(7) A method set forth in any of (1)–(6) above, wherein the time for polymerizing the emulsion is within 30 minutes.

(8) In the production of a porous cross-linked polymer by the steps of mixing an oil phase containing a monomer component comprising a polymerizing monomer and a cross-linking monomer and a surfactant as essential components and a water phase containing water as an essential component thereby obtaining a water in oil type high internal phase emulsion and polymerizing this emulsion in the presence of a polymerization initiator, a method for the production of the porous cross-linked polymer characterized by forming the emulsion in a thickness of not more than 50 mm or in the shape of a film or a sheet, keeping the time of polymerization within 30 minutes, and controlling the amount of the polymerization initiator which completes decomposition within the polymerization time in the range of 0.05–2.0 mol % based on the amount of the monomer component.

(9) In the production of a porous cross-linked polymer by the steps of mixing an oil phase containing a monomer component comprising a polymerizing monomer and a cross-linking monomer and a surfactant as essential components and a water phase containing water as an essential component thereby obtaining a water in oil type high internal phase emulsion and polymerizing this emulsion in the presence of a polymerization initiator, a method for the production of the porous cross-linked polymer characterized by subjecting the emulsion to a series of operation continuing from the step of forming through the step of polymerizing, forming the emulsion in a thickness of not more than 50 mm or in the shape of a film or a sheet, keeping the time of polymerization within 30 minutes, and controlling the amount of the polymerization initiator which completes decomposition within the polymerization time in the range of 0.05–2.0 mol % based on the amount of the monomer component.

(10) A method for continuous production of a porous cross-linked polymer, characterized by mixing an oil phase containing a monomer component comprising a polymerizing monomer and a cross-linking monomer and a surfactant as essential components and a water phase containing water as an essential component thereby obtaining a water in oil type high internal phase emulsion, continuously forming the emulsion, then heating the formed emulsion at a temperature-increasing rate of not less than 5° C./minute till a prescribed curing temperature, and thereafter polymerizing the heated emulsion.

(11) In the production of a porous cross-linked polymer by the steps of mixing an oil phase containing a polymerizing monomer, a cross-linking monomer, and a surfactant as essential components and a water phase containing water as an essential component thereby obtaining a water in oil type high internal phase emulsion and heating this emulsion till a prescribed curing temperature thereby polymerizing the emulsion, a method for the production of the porous cross-linked polymer characterized by forming the emulsion in a thickness of not more than 50 mm or in the shape of a film or a sheet and the formed emulsion is heated for temperature increase by the use of an active thermal energy ray.

(12) A method set forth in (11) above, wherein the active thermal energy ray is a near infrared ray.

(13) A method for continuous production of a-porous cross-linked polymer, characterized by mixing an oil phase containing a monomer component comprising a polymerizing monomer and a cross-linking monomer and a surfactant as essential components and a water phase containing water as an essential component thereby obtaining a water in oil type high internal phase emulsion, continuously forming the emulsion, then heating the formed emulsion by the use of an active thermal energy ray, and thereafter polymerizing the emulsion at a curing temperature.

BRIEF DESCRIPTION OF THE DRAWING

FIG. 1 is a graph showing several typical temperature changes of HIPE from the time the heating (polymerization) is started until the time the resultant polymer is cooled in a method for the production of a porous cross-linked polymer according to this invention. This drawing discharges the role of an explanatory diagram for explaining the definition of such important terms as the temperature-increasing rate in the heating, the time for temperature increase in the heating, and the polymerization time which are specified in this invention.

BEST MODE OF EMBODYING THIS INVENTION

The first aspect of this invention concerns a method for the production of a porous cross-linked polymer by the steps of mixing an oil phase containing a polymerizing monomer, a cross-linking monomer, and a surfactant as essential components and a water phase containing water as an essential component thereby obtaining a water in oil type high internal phase emulsion and heating this emulsion to a prescribed curing temperature thereby polymerizing the emulsion, which method is characterized by forming the emulsion in a thickness of not more than 50 mm and heating the emulsion at a temperature-increasing rate of not less than 5° C./minute.

Now, the method of production according to this invention will be specifically described below with respect to the component steps thereof in the order of their occurrence.

[I] Preparation of HIPE
(1) Raw Material Used for HIPE

The raw material to be used for the HIPE is only required to contain (a) a polymerizing monomer, (b) a cross-linking polymer, and (c) a surfactant as essential component for forming an oil phase and (d) water as an essential component for forming a water phase. It may optionally contain additionally (e) a polymerization initiator, (f) a salt, and (g) other additives as arbitrary components for forming an oil phase and/or a water phase.

(a) Polymerizing Monomer

The polymerizing monomer mentioned above is only required to possess one polymerizing unsaturated group in the molecular unit thereof. It does not need to be restricted particularly so long as it can be polymerized in a dispersion or a water in oil type high internal phase emulsion and forming cells. Preferably, it contains a (meth)acrylic ester at least partly, more preferably in a ratio of not less than 20 mass %, and particularly preferably in a ratio of not less than 35 mass %. The incorporation of the (meth)acrylic ester as a polymerizing monomer may bring the advantage of enabling the HIPE to produce a porous cross-linked polymer abounding in flexibility and toughness.

As typical examples of the polymerizing monomer, allylene monomers such as styrene; monoalkylene allylene monomers such as ethyl styrene, alpha methyl styrene, vinyl toluene, and ethyl vinyl benzene; (meth)acrylic esters such as methyl (meth)acrylate, ethyl (meth)acrylate, butyl (meth)

acrylate, isobutyl (meth)acrylate, isodecyl (meth)acrylate, 2-ethylhexyl (meth)acrylate, lauryl (meth)acrylate, stearyl (meth)acrylate, cyclohexyl (meth)acrylate, and benzyl (meth)acrylate; chlorine-containing monomers such as vinyl chloride, vinylidene chloride, and chloromethyl styrene; acrylonitrile compounds such as acrylonitrile and methacrylonitrile; and vinyl acetate, vinyl propionate, N-octadecyl acrylamide, ethylene, propylene, and butene may be cited. These polymerizing monomers may be used either singly or in the form of a mixture of two or more members.

The amount of the polymerizing monomer to be used is preferred to be in the range of 10–99.9 mass % based on the total mass of the monomer components composed of the polymerizing monomer and the cross-linking monomer to be described herein below. The reason for this particular range is that the HIPE containing this polymerizing monomer in this amount allows production of a porous cross-linked polymer having a minute pore diameter. The range is more preferably 30–99 mass % and particularly preferably 50–95 mass %. If the amount of the used polymerizing monomer is less than 10 mass %, the shortage would be at a disadvantage in rendering the produced porous cross-linked polymer brittle or possibly endowing it with an insufficient capacity for water absorption. Conversely, if this amount exceeds 99.9 mass %, the excess would be at a disadvantage in compelling the produced porous cross-linked polymer to suffer deficiency in strength and power for elastic recovery and even preventing the polymer from securing a sufficient capacity and a sufficient speed for water absorption.

(b) Cross-linking Monomer

The cross-linking monomer mentioned above is only required to have at least two polymerizing unsaturated groups in the molecule thereof. Similarly to the polymerizing monomer mentioned above, it does not need to be restricted particularly so long as it can be polymerized in a dispersion or a water in oil type high internal phase emulsion and forming a porous cross-linked polymer.

As typical examples of the cross-linking monomer, aromatic monomers such as divinyl benzene, trivinyl benzene, divinyl toluene, divinyl xylene, divinyl naphthalene, divinyl alkyl benzenes, divinyl phenanthrene, divinyl biphenyl, divinyl diphenyl methane, divinyl benzyl, divinyl phenyl ether, and divinyl diphenyl sulfide; oxygen-containing monomers such as vinyl furan; sulfur-containing monomers such as divinyl sulfide and divinyl sulfone; aliphatic monomers such as butadiene, isoprene, and pentadiene; ethylene glycol di(meth)acrylate, diethylene glycol di(meth)acrylate, triethylene glycol di(meth)acrylate, polyethylene glycol di(meth)acrylate, 1,3-butane diol di(meth)acrylate, 1,4-butane diol di(meth)acrylate, 1,6-hexane diol (meth) acrylate, octane diol di(meth)acrylate, decane diol di(meth) acrylate, trimethylol propane di(meth)acrylate, trimethylol propane tri(meth)acrylate, pentaerythritol tri(meth)-acrylate, pentaerythritol tetra(meth)acrylate, dipentaerythritol di(meth)acrylate, dipentaerythritol tri(meth)acrylate, dipentaerythritol tetra(meth)acrylate, N,N'-methylenebis(meth) acrylamide, triallyl isocyanurate, triallyl amine, and tetraallyloxy ethane, and ester compounds of polyhydroxy alcohols with acrylic acid or methacrylic acid such as hydroquinone, catechol, resorcinol, and sorbitol may be cited. These cross-linking monomers may be used either singly or in the form of a mixture of two or more members.

The amount of the cross-linking monomer mentioned above to be used is preferably in the range of 0.1–90 mass %, more preferably 1–70 mass %, and particularly preferably 5–50 mass %, based on the total mass of the monomer component composed of the polymerizing monomer mentioned above and the cross-linking monomer. If the amount of the cross-linking monomer to be used is less than 0.1 mass %, the shortage would be at a disadvantage in compelling the produced porous cross-linked polymer to suffer deficiency in strength and elastic recovery power and in ability to attain sufficient absorption per unit volume or unit mass and even preventing the polymer from securing a sufficient capacity and a sufficient speed for water absorption. Conversely, if the amount of the cross-linking monomer to be used exceeds 90 mass %, the excess would be at a disadvantage in rendering the produced porous cross-linked polymer brittle or possibly endowing it with an insufficient capacity for water absorption.

(c) Surfactant

The surfactant is not particularly discriminated so long as it be capable of emulsifying the water phase in the oil phase forming the HIPE. Any of the nonionic surfactants, cationic surfactants, and amphoteric surfactants heretofore known to the art may be used.

The nonionic surfactants include nonyl phenol polyethylene oxide adduct; block polymer of ethylene oxide and propylene oxide; sorbitan fatty acid esters such as sorbitan monolaurate, sorbitan monomyristvlate, sorbitan monopalmitate, sorbitan monostearate, sorbitan tristearate, sorbitan monooleate, sorbitan trioleate, sorbitan sesquioleate, and sorbitan distearate; glycerin fatty acid esters such as glycerol monostearate, glycerol monooleate, diglycerol monooleate, and self-emulsifying glycerol monostearate; polyoxyethylene alkyl esters such as polyoxyethylene lauryl ether, polyoxyethylene cetyl ether, polyoxyethylene stearyl ether, polyoxyethylene oleyl ether, and polyoxyethylene higher alcohol ethers; polyoxyethylene alkylaryl ethers such as polyoxyethylene nonyl phenyl ether; polyoxyethylene sorbitan fatty acid esters such as polyoxyethylene sorbitan monolaurate, polyoxyethylene sorbitan monomyristylate, polyethylene sorbitan monopalmintate, polyoxyethylene sorbitan monostearate, polyoxyethylene sorbitan tristearate, polyoxyethylene sorbitanmonooleate, and polyoxyethylene sorbitantrioleate; polyoxyethylene sorbitol fatty acid esters such as tetraoleic acid polyoxyethylene sorbit; polyoxyethylene fatty acid esters such as polyethylene glycol monolaurate, polyethylene glycol monostearate, polyethylene glycol distearate, and polyethylene glycol monooleate; polyoxyethylene alkyl amines; hydrogenated polyoxyethylene castor oil; and alkyl alkanol amides, for example. They preferably have HLB not exceeding 10, more preferably falling in the range of 2–6. These nonionic surfactants may be used in the form of a combination of two or more members. This combined use may possibly result in improving the stability of the HIPE.

The cationic surfactants include quaternary ammonium salts such as stearyl trimethyl ammonium chloride, ditallow dimethyl ammonium methyl sulfate, cetyl trimethyl ammonium chloride, distearyl dimethyl ammonium chloride, alkylbenzyl dimethyl ammonium chloride, and lauryl trimethyl ammonium chloride; alkyl amine salts such as coconut amine acetate and stearyl amine acetate; alkyl betaines such as lauryl betaine, stearyl betaine, and lauryl carboxymethyl hydroxyethyl betain; and amine oxides such as lauryl dimethyl amine oxide, for example. The use of such a cationic surfactant may possibly enable the produced porous cross-linked polymer to manifests an excellent antibacterial property when the polymer is used for an absorbent material, for example.

Incidentally, the combined use of a nonionic surfactant and a cationic surfactant may possibly result in improving the stability of the HIPE.

The amount of the surfactant mentioned above to be used is preferably in the range of 1–30 parts by mass, more preferably 3–15 parts by mass, based on 100 parts by mass of the monomer components composed of a polymerizing monomer and a cross-linking monomer. If the amount of the surfactant to be used is less than 1 part by mass, the shortage would be at a disadvantage in possibly impairing the stability of the high dispersibility of the HIPE and preventing the surfactant from sufficiently manifesting the operation and function inherent therein. Conversely, if the amount exceeds 30 parts by mass, the excess would be at a disadvantage in possibly rendering the produced porous cross-linked polymer excessively brittle and disrupting the expected proportionate addition to the effects of the surfactant.

(d) Water

As the water mentioned above, besides tap water, purified water, and deionized water, the waste water resulting from the production of the porous cross-linked polymer may be used either in its unmodified form or after undergoing a prescribed treatment.

The amount of the water to be used can be properly selected to suit the purpose for which the porous cross-linked polymer possessing open cells is used (such as, for example, a water absorbent material, an oil absorbent material, a soundproof material, and a filter). The amount of the water to be used may be automatically decided by selecting the water phase/oil phase (W/O) ratio of the HIPE so as to obtain a void ratio conforming to the use and the object because the void ratio of the porous cross-linked polymer is decided by varying the W/O ratio of the HIPE.

(e) Polymerization Initiator

For the purpose of accomplishing the polymerization of the HIPE in a very brief time as aimed at by this invention, it is proper to use a polymerization initiator. The polymerization initiator is only to be required to be usable in reverse-phase emulsion polymerization. It may be a water-soluble or an oil-soluble polymerization initiator, whichever may better suit the occasion.

As typical examples of the water-soluble polymerization initiator, azo compounds such as 2,2'-azobis(2-amidinopropane)dihydrochloride; persulfates such as ammoniumpersulfate, potassium persulfate, and sodium persulfate; and peroxides such as potassium peracetate, sodium peracetate, potassium percarbonate, and sodium percarbonate may be cited.

As typical examples of the oil-soluble polymerization initiator, hydroperoxides such as cumene hydroperoxide, t-butylhydroperoxide, diisopropyl benzene hydroperoxide, p-menthane hydroperoxide, 1,1,3,3-tetramethylbutyl hydroperoxide; dialkyl peroxides such as di-t-butyl peroxide, 2,5-dimethyl-2,5-di(t-butyl peroxy)hexane, 6-butyl cumyl peroxide, and dicumyl peroxide; peroxy carbonates such as diisopropyl peroxy dicarbonate, dicyclohexyl peroxy dicarbonate, di(sec-butyl)peroxy dicarbonate, and di(2-ethylhexyl)peroxy dicarbonate; diacyl peroxides such as acetyl peroxide, propionyl peroxide, decanoyl peroxide, isobutyryl peroxide, octanoyl peroxide, lauroyl peroxide, stearoyl peroxide, and benzoyl peroxide; peroxy ketals such as 1,1'-di-(t-butylperoxy)cyclohexane, and 1,1'-di-(t-butylperoxy)-3,3,5-trimethyl cyclohexane; ketone peroxides such as cyclohexanone peroxide, methylcyclohexanone peroxide, methylethyl ketone peroxide, and acetyl acetone peroxide; and peroxy esters such as cumyl peroxyneodecanoate, 1,1,3,3-tetramethyl butyl peroxyneodecanoate, 1-cyclohexyl-1-1-methylethyl peroxyneodecanoate, t-hexyl peroxyneodecanoate, t-butyl peroxyneodecanoate, t-butyl peroxyisobutylate, t-butyl peroxypivalate, 1,1,3,3-tetramethyl butyl peroxy-2-ethylhexanoate, 2,5-dimethyl-2,5-di(2-ethylhexanoylperoxy)hexane, 1-cyclohexyl-1-1-methylethyl peroxy-2-hexanoate, t-amylperoxy-2-ethylhexanoate, and t-butylperoxy-2-ethylhexanoate may be cited. These polymerization initiators may be used singly or in the form of a mixture of two or more members. As a matter of course, a water-soluble polymerization initiator and an oil-soluble polymerization initiator may be used in combination.

The amount of the polymerization initiator to be used in the reversed-phase emulsion polymerization mentioned above is preferably in the range of 0.05–25 parts by mass, more preferably 1.0–10 parts by mass, based on 100 parts by mass of the total amount of the monomer components composed of a polymerizing monomer and a cross-linking agent, though depending on the combination of the monomer component and the polymerization initiator. If the amount of the polymerization initiator to be used is less than 0.05 part by mass, the shortage would be at a disadvantage in increasing the amount of the unreacted monomer component and consequently adding to the amount of the residual monomer in the produced porous cross-linked polymer. Conversely, if the amount of the polymerization initiator to be used exceeds 25 parts by mass, the excess would be at a disadvantage in rendering the control of the polymerization difficult and degrading the mechanical properties of the produced cross-linked polymer.

It is further allowable to use a redox polymerization initiator formed by combining the polymerization initiator mentioned above with a reducing agent. In this case, a water-soluble or an oil-soluble polymerization initiator may be used, whichever may better suit the occasion. A water-soluble redox polymerization initiator may be used in combination with an oil-soluble redox polymerization initiator.

As typical examples of the water-soluble reducing agent, sodium hydrogen sulfite, potassium hydrogen sulfite, sodium thiosulfate, potassium thiosulfate, L-ascorbic acid, erythorbic acid, ferrous salts, formaldehyde sodium sulfoxylate, glucose, dextrose, triethanol amine, and diethanol amine may be cited. As typical examples of the oil-soluble reducing agent, dimethyl aniline may be cited. These reducing agents of the redox polymerization initiator type may be used singly or in the form of a mixture of two or more members.

The ratio of the content of the reducing agent in the case of the redox polymerization initiator (ratio by mass) is such that the polymerization initiator (oxidizing agent)/reducing agent is in the approximate range of 1/0.01–1/10, preferably 1/0.2–1/5.

The polymerization initiator (including the redox polymerization initiator type) is only required to be present at least during the polymerization of the HIPE. It may be added ① to the oil phase and/or the water phase in advance of the formation of the HIPE, ② at the same time that the HIPE is formed, or ③ after the formation of the HIPE as described specifically herein below. In the case of the redox polymerization initiator, the polymerization initiator (oxidizing agent) and the reducing agent may be added at separate times.

(f) Salt

The salt mentioned above may be used when it is needed to improve the stability of the HIPE.

As typical examples of the salt, water-soluble salts including halogenides, sulfates, and nitrates of alkali metals and alkaline earth metals such as calcium chloride, sodium sulfate, sodium chloride, and magnesium sulfate may be cited. These salts may be used either singly or in the form of two or more members. The salt is preferred to be added to the water phase. Among other salts enumerated above, a polyvalent metal salt may be used advantageously from the viewpoint of the stability of the HIPE during the polymerization.

The amount of such a salt to be used is preferably in the range of 0.1–20 parts by mass, preferably 0.5–10 parts by mass, based on 1.00 parts by mass of water. If the amount of the salt to be used exceeds 20 parts by mass, the excess would be at a disadvantage economically in causing the waste water squeezed out of the HIPE to contain a salt copiously and adding to the cost of disposal of this waste water without bringing a proportionate addition to the expected effects. If the amount of the salt is less than 0.1 part by mass, the shortage would possibly prevent the added salt to manifest the operation and the effect satisfactorily.

(g) Other Additive

Other various kinds of additives may be properly used on the condition that they are capable of imparting qualities and functions of their own and consequently resulting in improving the production conditions, the properties of the HIPE, and the performance of the porous cross-linked polymer. For example, a base and/or a buffer may be added for the purpose of pH adjustment. The amounts of these other additives to be used may be properly decided so as to ensure thorough manifestation of qualities, functions, and economy commensurate to the respective purposes of addition.

As typical examples of the additive of interest, activated carbon, inorganic powder, organic powder, metal powder, deodorant, antibacterial agent, fungicide, perfume, and various macromolecular surfactants may be cited.

(2) Method for Preparation of HIPE

The method for preparation of the HIPE which can be used in this invention does not need to be particularly discriminated but may be properly selected among the methods for the preparation of the HIPE heretofore known to the art. Now, a typical method for the preparation will be specifically described below.

For a start, components for forming an oil phase, i.e. a polymerizing monomer, a cross-linking monomer, and a surfactant, and optionally an oil-soluble polymerization initiator (including an oil-soluble redox polymerization initiator), and other additives weighed out in the respective amounts specified above are mixed at a prescribed temperature to prepare a homogeneous oil phase.

Separately, components for forming a water phase, i.e. water, and optionally a water-soluble polymerization initiator (including a water-soluble redox polymerization initiator), a salt, and other additives weighed out in the respective amounts specified above are mixed and heated to a temperature in the range of 30–95° C. to prepare a homogeneous water phase.

Then, the oil phase which is a mixture of a monomer component, a surfactant, and the like prepared as described above and the water phase which is a mixture of water, a water-soluble salt, and the like are combined and efficiently mixed at a temperature for forming an HIPE (an emulsification temperature) which will be specifically described herein below as retained under a proper shearing force to effect the emulsification and stable preparation of the HIPE. As the method for mixing the water phase and the oil phase particularly for the stable preparation of the HIPE, it is commendable to adopt a method of keeping the oil phase in a stirred state and adding the water phase to the stirred oil phase continuously over a period of several minutes to some tens of minutes. Otherwise, the HIPE aimed at may be produced by mixing a part of the water component with the oil component thereby forming a HIPE and subsequently continuing the mixing while adding the remaining water phase part thereto.

(3) Water Phase/Oil Phase (W/O) Ratio

The water phase/oil phase (W/O) ratio does not need to be particularly discriminated but may be properly selected to suit the purpose for which the porous cross-linked polymer having open cells is used (such as, for example, a water absorbent material, an oil absorbent material, a soundproof material, and a filter). It is only required to possess a W/O ratio of not less than 3/1 as specified above. This ratio is preferably in the range of 10/1–250/1, preferably 10/1–100/1.

If the W/O ratio is less than 3/1, the shortage would be at a disadvantage in suffering the porous cross-linked polymer to acquire an insufficient capacity for the absorption or water and energy, an unduly low degree of aperture in the surface of the polymer and fail to acquire sufficient perviousness to liquid.

The void ratio of the porous cross-linked polymer may be decided by varying the W/O ratio. It is, therefore, commendable to select the W/O ratio so as to obtain a void ratio conforming to the use and the object. When the produced porous cross-linked polymer is used in a disposable diaper, a sanitary material, or other absorbent materials, the W/O ratio is preferred to be set within the approximate range of 10/1–100/1. Incidentally, the HIPE which is obtained by mixing a water phase with an oil phase may be generally a while highly viscous emulsion.

(4) Apparatus for Production of HIPE

The apparatus for the production of the HIPE does not need to be particularly discriminated but may be selected among apparatuses for production of HIPE heretofore known to the art. As the stirrer (emulsifying device) to be used for mixing the water phase with the oil phase, conventional stirring devices and the mixing devices may be used. As typical examples of the stirrer, stirring devices provided with propeller type, paddle type, and turbine type vanes, homomixers, line mixers, and pin mills may be cited. Any of these stirrers may be used.

(5) Temperature for Formation (Emulsification Temperature) of HIPE, $T_O$

The temperature for formation (emulsification temperature) of HIPE, $T_O$, is generally in the range of 20–110° C. From the viewpoint of the stability of the HIPE, it is preferably in the range of 30–105° C., more preferably 40–95° C.

If the temperature for HIPE formation is less than 20° C., the shortage would be at a disadvantage in requiring an unduly long time for heating depending on the curing temperature. Conversely, if this temperature exceed 110° C., the excess would be at a disadvantage in possibly impairing the stability of the formed HIPE.

The HIPE aimed at is preferably formed by adjusting the temperatures of the oil phase and/or the water phase to the prescribed temperature for formation (emulsification temperature) in advance and then mixing the two phases. Since the amount of the water phase is large in the preparation (formation) of the HIPE, it is advantageous to adjust at least the temperature of the water phase to the prescribed temperature for formation (emulsification temperature). When the polymerizing monomer and the cross-linking monomer begin to polymerize while the emulsification is in process, the HIPE formed of the polymer is possibly deprived of the stability. When the HIPE containing the polymerization initiator (including a redox polymerization initiator) in advance is prepared, therefore, the temperature for the formation of the HIPE (emulsification temperature) may be preferably incapable of substantially inducing thermal decomposition. More preferably, the emulsification is effected at a temperature lower than the temperature at which the polymerization initiator (oxidizing agent) has a half time of 10 hours (10 hour half-life temperature).

[II] Production of Porous Cross-linked Polymer (1) Addition of Polymerization Initiator (a) Time for Addition of Polymerization Initiator In this invention, ① a method of adding a polymerization initiator to a water phase and/or an oil phase and mixing them prior to the formation of the HIPE, ② a method of effecting this addition at the same time of the formation of the HIPE, and ③ a method of effecting the addition of a polymerization initiator after the formation of the HIPE may be cited. These methods may be optionally used in combination. When the polymerization initiator is a redox polymerization initiator, the methods of ①–③ mentioned above may be arbitrary selected and used for the addition of a polymerization initiator (oxidizing agent) and a reducing agent. In the case of the method of ①, it is convenient to have the polymerization initiator or the reducing agent added in advance to the oil phase when the agent is soluble in oil or to the water phase when the agent is soluble in water. Alternatively, a method of adding an emulsion of an oil-soluble polymerization initiator (oxidizing agent) or a reducing agent to the water phase may be cited.

(b) Form of Use of Polymerization Initiator and Method for Addition Thereof

The polymerization initiator may be used in an undiluted form or in the form of a solution or dispersion in water or an organic solvent. When the addition of the polymerization initiator is effected at the same time of the formation of the HIPE as in the method of ② or after the formation of the HIPE as in the method of ③, as shown in the above paragraph, "(a) Time for addition of polymerization initiator", it is important that the added polymerization initiator should be promptly and homogeneously mixed with the HIPE for the purpose of avoiding uneven polymerization of the monomer component. Further, the HIPE which has incorporated the polymerization initiator therein is introduced into a polymerization vessel or a continuous polymerization machine which is a polymerization apparatus. From this point of view, a method which comprises inserting a polymerization initiator introducing path provided on the path interconnecting the emulsifying device for preparing the HIPE and the polymerization vessel or the continuous polymerizing machine, adding the polymerization initiator to the HIPE via the introducing path, and mixing them in a line mixer may be commendable, for example.

When the temperature for the formation (emulsification temperature) of the HIPE and the curing temperature have a small difference, a method for adding a polymerization initiator immediately before the polymerization (the method of ② or the method of ③ mentioned above) may be advantageous because the emulsifying temperature and the curing temperature approximate closely to each other, the polymerizing monomer and the cross-linking monomer begin to be polymerized during the process of emulsification, and the HIPE is deprived of stability by the formation of the polymer.

The amount of the polymerization initiator to be added is the same as in the method of ① described in the preceding passage titled "method for preparation of HIPE".

(2) Forming Thickness and Shape of HIPE

In the first aspect of this invention, the fact that the produced HIPE is formed in a thickness of not more than 50 mm and the HIPE in this thickness is polymerized constitutes itself one of the important constitutions. Properly,the HIPE is preferably formed in a thickness of not more than 30 mm, more preferably not more than 15 mm, particularly preferably not more than 10 mm, and most preferably about 5 mm following the polymerization of the formed HIPE. By decreasing the forming thickness to not more than 50 mm, it is made possible to increase the temperature rapidly to the curing temperature aimed at and complete the polymerization in a very brief time. If the forming thickness of the HIPE exceeds 50 mm, the excess would be at a disadvantage in preventing the HIPE from being polymerized uniformly throughout and the porous cross-linked polymer from acquiring uniform physical properties and suffering the polymer in the process of formation to separate water discernibly. Efforts to avoid this disadvantage may require the polymerization to proceed at a comparatively low temperature for a long time and renders the relevant operation conspicuously deficient in productivity. The lower limit of the forming thickness of the HIPE does not need to be particularly restricted but may be properly decided to suit the purpose of use. This is because a pile of a multiplicity of porous cross-linked polymers having a small thickness, when used in a liquid absorbent material, an energy absorbent material, or a chemical-impregnating substrate, enables such material to secure the performance and the quality as required. When this thickness is less than 0.1 mm, however, the HIPE in this thickness would be difficult to be handled and demands due attention. The term "thickness" as used herein refers to the interval from one side of a given object to the opposite side. When the HIPE is heated from the exterior, for example, the term means a distance (wall thickness) of the HIPE in the direction perpendicular to the surface to be heated. The shape in which the HIPE is formed does not need to be particularly discriminated but may be arbitrarily selected.

(3) Method for Polymerization of HIPE

Then, the method for polymerizing the HIPE mentioned above does not need to be particularly limited but may be properly selected among methods for HIPE polymerization heretofore known to the art. Generally, the polymerization may be effected by a method of static polymerization which is performed under such conditions as incapable of breaking a structure of water drops highly dispersed in the oil of the HIPE. In this case, the polymerization may be effected in a batch pattern in which the HIPE is polymerized batchwisely or in a continuous pattern in which the HIPE is polymerized by being continuously fed and cast.

For the purpose of improving the effects by the rapid polymerization which characterizes the first aspect of this invention, the continuous polymerization is preferred over the batch polymerization. For example, it is commendable to adopt the method of continuous polymerization which resides in continuously casting the HIPE in a thickness of not more than 50 mm on a running belt and polymerizing the cast HIPE.

(4) Curing Temperature of HIPE, $T_1$

The curing temperature, $T_1$, of the HIPE of this invention is only required to be higher than the forming temperature, $T_0$, of the HIPE. Generally, it is in the range of a room temperature to 150° C. From the viewpoint of the stability of the HIPE and the rate of polymerization, the curing temperature is preferably in the range of 60–110° C., more preferably 80–110° C. If the curing temperature is lower than a room temperature, the shortage would be at a disadvantage industrially in requiring an unduly long time for the polymerization. Conversely, if the curing temperature exceeds 150° C., the excess would be possibly at a disadvantage in suffering the produced porous cross-linked polymer to be deprived of uniformity of a pore diameter and to be lowered in strength. As regards the relation between $T_0$ and $T_1$, this invention is only required to satisfy the relation of $T_0<T_1$.

For the sake of forming the HIPE uniformly, the difference between $T_0$ and $T_1$ [$T_1-T_0$] is preferred to be in the range of 2–50° C. If the temperature difference [$T_1-T_0$] is less than 2° C., the shortage would be at a disadvantage in retarding the start of the polymerization and depriving the porous cross-linked polymer of uniformity. If the temperature difference [$T_1-T_0$] exceeds 50° C., the excess would be at a disadvantage in rendering the HIPE unstable during the temperature increase by heating. In this invention, when the temperature at the time that the heating of the HIPE is started is lower than the temperature for formation of the HIPE, $T_0$, the temperature of the HIPE at the time for starting the heating is defined as $T_0$. (Thus, regarding the temperature difference [$T_1-T_0$] and the temperature-increasing rate [$T_{0.9}-T_0/(t_{0.9}-t_0)$] defined in this specification by using $T_0$, this $T_0$ denotes a temperature of the HIPE at the time of starting the heating when the temperature for starting the heating is lower than the temperature of HIPE formation.) From the viewpoint of the performance and quality of the produced porous cross-linked polymer and the control of temperature as well, it is commendable to adjust the curing temperature (polymerization temperature) [$T_1$] within a prescribed range (±several ° C.) by controlling the amount of the energy from the exterior (see FIG. 1). The curing temperature may be varied at two or more stages during the course of polymerization This invention does not exclude the polymerization which involves this variation of the curing temperature.

After the polymerization (after the elapse of the curing time for polymerization), the polymer may be cooled, occasionally gradually, to a prescribed temperature, though not definitely. The porous cross-linked polymer as formed may be shifted without being cooled to the step of such after-treatment as dehydration or compression which will be described specifically herein below.

(5) Temperature-increasing Rate by Heating

Then, for the first aspect of this invention, the fact that the produced HIPE is formed in a thickness of not more than 50 mm and then rapidly increasing the temperature thereof to a desired curing temperature at a temperature-increasing rate of not less than 5° C./minute constitutes itself one of the important constitutions thereof. If the temperature-increasing rate is less than 5° C./minute, the shortage would be at a disadvantage in retarding the polymerization and possibly suffering the polymer to show the phenomenon of water separation copiously. Preferably, the temperature-increasing rate may be in the range of 5–60° C./minute. If the temperature-increasing rate exceeds 60° C./minute, the excess would be at a disadvantage in preventing the emulsified state of the HIPE from being stably maintained and possibly crushing the HIPE. It is preferable to control the temperature-increasing rate by heating in the range of 10–40° C./minute when the HIPE forming thickness is not more than 15 mm, i.e. a more preferable level, and in the range of 10–30° C./minute when the HIPE forming thickness is not more than 10 mm, i.e. a particularly preferable level. The term "temperature-increasing rate" as used herein refers to [$T_{0.9}-T_0/(t_{0.9}-t_0)$] which is obtained only from the time [$t_{0.9}$] required to reach the temperature [$T_{0.9}$] equivalent to 90% of the temperature difference between the prescribed curing temperature, [$T_1$] and the temperature for formation of HIPE, [$T_0$], but not to [$T_1-T_0/(t_1-t_0)$] which is determined from the time [$t_1$] required for the temperature [$T_0$] of the HIPE at the time for starting the heating [$t_0$] to reach (constantly) a prescribed curing temperature [$T_1$] (see FIG. 1). On other words, this relation is represented by the equation, [$T_{0.9}$]=[$T_0$]+([$T_1$]−[$T_0$])×0.9. The actual temperature-increasing rate, though variable with a means to increase temperature by heating and a means to control the temperature, is not easily fixed constantly till the prescribed curing temperature is reached as shown by the curve ① in FIG. 1 but is generally varied with a means to increase temperature by heating and a means to control the temperature till the prescribed curing temperature is reached as shown by the curves ②–⑥ in FIG. 1. For example, as shown by ②–⑤ in FIG. 1, the heating may be controlled so that a large temperature-increasing rate may occur during the rising part immediately after the start of the heating for temperature increase, and a decreased temperature-increasing rate may occur in the neighborhood of the prescribed curing temperature. Alternatively, as shown by ⑥ in FIG. 1, the heating may be controlled so that a decreased temperature-increasing rate may occur during the rising part immediately after the start of the heating for temperature increase and during the neighborhood of the curing temperature, and a very large temperature-increasing rate may occur in a comparatively brief time between these two durations just mentioned. Even when the temperature-increasing rate during the course of temperature increase does not always falls within the range as in the cases mentioned above, it suffices only to satisfy the requirement, [$T_{0.9}-T_0/(t_{0.9-t0})$]≧5° C./minute, according to the definition mentioned above. As regards the temperature increase by heating to a prescribed curing temperature, even the case in which the temperature is suffered to exceed a prescribed curing temperature on account of excess heating must be temporarily lowered as represented by the curve ③ or ⑤ in FIG. 1 may be embraced in the scope of this invention so long as the requirement just mentioned above be fulfilled. That is, the phrase "the polymerization is effected following the step of increasing temperature by heating to a prescribed curing temperature" ought not be interpreted in a narrower sense, such that "the polymerization is effected in a state of constantly increasing temperature by heating to a prescribed curing temperature".

This invention, for the purpose of determining a temperature-increasing rate of a given HIPE sample, requires the temperature of the HIPE sample to be measured. In this case, it may suffice to measure the temperature in the central part in the direction of thickness of the given HIPE sample formed in a prescribed thickness or in the form of a sheet or a film.

(6) Time for Temperature Increase by Heating

The total duration of the temperature increase at the temperature-increasing rate mentioned above may be not less than 15 seconds, preferably in the range of 15 seconds to 10 minutes. If the temperature increase is completed in a duration shorter than 15 seconds or if it is continued for a period exceeding ten minutes, the HIPE would entail the possibility of failing to remain stably during the temperature increase, inducing the phenomenon of water separation copiously, and undergoing polymerization unevenly.

From the viewpoint of the uniformity of the polymerization which produces the porous cross-linked polymer, the total duration mentioned above may be preferably in the range of 15 seconds–10 minutes, most preferably 30 seconds–5 minutes.

The term "duration of temperature increase by heating" to be used herein refers to the total duration $[t_0-t_1]$ from the time of starting the temperature increase of the HIPE by heating $[t_0]$ to the time $[t_1]$ at which the HIPE reaches (constantly) a prescribed curing temperature $[T_1]$ (see FIG. 7)

(7) Time for Curing Polymer

The method of this invention may be unusually effective as a means for stably implementing the polymerization in such a brief time as in the range of some tens of seconds–30 minutes. To be more specific, for the first aspect of this invention, the time for curing the polymer may be preferably within 30 minutes, more preferably within 10 minutes, and particularly preferably in the range of 1–10 minutes. If the time for curing the polymerization exceeds 30 minutes, the excess would be possibly at a disadvantage commercially in degrading productivity. If the time is less than 1 minutes, the shortage would be possibly at a disadvantage in suffering the porous cross-linked polymer to be deficient in strength. It should be comprehended that this invention does not exclude the adoption of a time longer than the range mentioned above for curing the polymer. The term "time for curing the polymer" as used herein refers to the total duration $[t_2-t_0]$ from the time for starting the temperature increase by heating $[t_0]$ to the time for completing the polymerization $[t_2]$ (see FIG. 1).

(8) Polymerization Device

The polymerization device which can be used in this invention does not need to be particularly discriminated. Among chemical devices known to the art, that which fits for the relevant process of polymerization may be utilized or used as duly modified. For the batch polymerization, for example, a polymerization vessel having a shape fit for the applications thereto may be used. For the continuous polymerization, a continuous polymerizing machine such as a conveyor belt provided with compression rollers may be utilized. Such devices may be additionally provided with a means to increase a temperature by heating and a means to control a temperature increase which fit for the process of polymerization such as, for example, a means capable of rapidly increasing temperature by heating to a curing temperature by the use of an active thermal energy ray such as microwaves and a near infrared ray allowing the use of radiation energy or a heat medium such as hot water or hot air. Use of other means for the provision in question should not be excluded. Further, the measure to prevent the surface of the HIPE injected into the polymerization vessel used in the case of batch polymerization and the (both upper and lower) surface parts of the HIPE formed on the drive conveying device such as a conveyor in the case of continuous polymerization from contacting with an ambient air (more specifically, oxygen in an air) from the time the polymerization is initiated to the time the polymerization is completed may form an optimum approach to the impartation of a perfect open cell structure to such surface parts. It is, therefore, desirable to have the HIPE surfaces tightly covered with a varying sealing material. The quality of material for a polymerization device does not need to be particularly discriminated. The polymerization device which is made of such a metal (including an alloy) as aluminum, iron, or stainless steel, such a synthetic resin as polyethylene, polypropylene, a fluorine resin, polyvinyl chloride, or an unsaturated polyester resin, or such a fiber reinforced resin (FRP) as obtained by reinforcing such a synthetic resin with glass fibers or carbon fibers may be used.

(9) Shape of Porous Cross-linked Polymer

The shape of the porous cross-linked polymer which is obtained by the process of polymerization described above is not particularly limited. The polymer may assume an arbitrary shape.

Specifically, for the production by the batch polymerization of a porous cross-linked polymer identical in shape with an inner contour of a polymerization vessel, it suffices to select the polymerization vessel on the condition that the inner contour thereof should conform to the shape expected to be imparted to the products by the polymerization. The porous cross-linked polymer may be produced in the shape of a block (or sheet) having a thickness of not more than 50 mm and the block may be cut into a sheet or a film (a plate or a thin plate) each having a thickness of 5 mm, for example. Alternatively, the polymer may be produced in the shape of a cylinder having a wall thickness (thickness) of 50 mm and this cylinder may be properly cut into pieces having a circular cross section. The oil phase and the water phase in the homogenized HIPE are prone to be separated upwardly and downwardly, and the HIPE has such properties as being soft and friable in the form of yogurt. Therefore, in the case of the production by the method of continuous polymerization, it is commendable to polymerize the HIPE in the shape of a sheet or a film as conveyed meantime horizontally and to form a porous cross-linked polymer in the shape of a sheet or a film. Likewise in this case, the polymer may be produced in the shape of a block (or sheet) having a thickness of not more than 50 mm and the block may be cut into sheets each having a thickness of 5 mm, for example.

(10) Step of After-treatment (Reduction to Finished Product) After Formation of Porous Cross-linked Polymer (a) Dehydration The porous cross-linked polymer formed in consequence of the completion of the polymerization may be generally dehydrated by compression, aspiration under reduced pressure, or the combination thereof. Generally, the dehydration thus implemented may expel a portion in the range of 50–98% of the water used, with the result that the remainder of the water would adhere to and remain thereafter on the porous cross-linked polymer.

The ratio of dehydration may be properly set to suit for the purpose for which the porous cross-linked polymer is intended, for example. Generally, it may suffice to set a dehydration ratio so that the water content of the porous cross-linked polymer be in the range of 1 to 10 g, preferably in the range of 1–5 g, per 1 g of the polymer in a perfectly dried state.

(b) Compression

The porous cross-linked polymer of this invention can be compressed to one of several parts of the original thickness. The porous cross-linked polymer in the shape of a compressed sheet has a smaller volume as compared with the originally formed porous cross-linked polymer and consequently allows the reduction in the cost of transportation and storage. The porous cross-linked polymer in the compressed shape is characterized by exhibiting, on contact with a large volume of water, the quality of absorbing water and reverting to the original thickness and effecting this absorption of water at a higher rate than the porous cross-linked polymer of the original thickness.

For the impartation of the compressed shape, it suffices to use a compression means fit for the shape of the porous cross-linked polymer and therefore capable of exerting an uniform pressure to bear on the porous cross-linked polymer throughout the entire volume thereof and consequently compressing the polymer uniformly.

The porous cross-linked polymer is preferred to be in the shape of a sheet, because the sheet allows easy exertion of an uniform pressure throughout the entire volume thereof, permits use of numerous existing compression devices, and warrants convenience of manipulation. The porous cross-linked polymer in the shape of such a sheet is only required, after the dehydration, to be passed between a pair of rolls or belts opposed at a prescribed interval. The sheet generally has the thickness thereof decrease to a certain extent because of the work of compression or the work of aspiration under reduced pressure at the step of dehydration mentioned above. When the sheet after the completion of the step of dehydration has a thickness within the specified range, it requires no new provision of the step of compression. As regards the deformation by compression to be implemented on the porous cross-linked polymer in the shape of other than a sheet, the compression of a porous cross-linked polymer in the shape of a cylinder, for example, may be carried out by using a proper device such as, for example, a concentric double wall cylinder comprising an outer cylinder made of a metallic material incapable of being deformed and an inner cylinder made of a rubber tube capable of being uniformly inflated concentrically such that the polymer of the cylindrical shape interposed between the two cylinders may be compressed by introducing air into the tube of the inner cylinder. Alternatively, the compression of the porous cross-linked polymer in the shape of a cylinder may be attained by fitting in this cylinder a rotary shaft conforming to the inside diameter of the cylinder, pressing a roll against the outside of the cylinder, and rotating both the rotary shaft and the roll.

During the preceding step of dehydration and the present step of compression, the temperature at which the porous cross-linked polymer is compressed is preferably higher than the glass transition temperature of the porous cross-linked polymer. If the temperature is lower than the glass transition temperature of the polymer, the shortage would be possibly at a disadvantage in suffering the porous structure to fracture or the pore diameter to alter.

The compression till not more than one half of the original thickness may be effective in terms of saving the space for transportation and storage and facilitating the handling. More preferably, this compression may be made till not more than one quarter of the original thickness.

(c) Washing

The porous cross-linked polymer, for the purpose of imparting an improving surface condition thereto, may be washed with purified water or an aqueous solution or a solvent containing an arbitrarily selected additive.

(d) Drying

The porous cross-linked polymer obtained by the steps mentioned above, when necessary, may be hot dried with hot air or microwaves or may be moistened for adjustment of the water content thereof.

(e) Cutting

The porous cross-linked polymer obtained by the steps mentioned above, when necessary, may be cut into proper sizes and worked to obtain a finished product fitting for the varying uses.

(f) Impregnation

The porous cross-linked polymer obtained by the steps mentioned above, when necessary, may be impregnated with such an additive as a detergent, an aromatizer, a deodorant, and an antibacterial agent so as to be endowed with pertinent forms of functionality.

Then, the second aspect of this invention concerns a method for the production of a porous cross-linked polymer by the steps of mixing an oil phase containing a polymerizing monomer, a cross-linking monomer, and a surfactant as essential components and a water phase containing water as an essential component thereby obtaining an HIPE and heating the HIPE to a prescribed curing temperature thereby polymerizing the emulsion, which method is characterized by forming the HIPE being in the shape of a film or a sheet and heating the HIPE at a temperature-increasing rate of not less than 5° C./minute.

In the second aspect of this invention, the fact that the HIPE is polymerized after it has been formed in the shape of a film or a sheet constitutes one of the main constitutions. Then, by additionally satisfying the condition (as another important constitution) that the temperature of the HIPE is rapidly increased by heating at a temperature-increasing rate of not less than 5° C./minute to a desired curing temperature, it is possible to polymerize uniformly the entire HIPE formed in the shape of a film or a sheet, impart uniform physical properties to the porous cross-linked polymer, and prevent the HIPE in the process of formation from inducing separation of water. The shape of a film and the shape of a sheet to be used herein are discriminated by calling the HIPE formed in a thickness of less than 0.25 mm a film; and the HIPE formed in a thickness of not less than 0.25 mm a sheet, respectively.

Since each the constitutions of the second aspect of this invention are basically as described above with respect to the first aspect of this invention, the constitutions except for the following constitutions will be omitted from the following description to avoid useless repetition.

For the shape of the porous cross-linked polymer recited in (9) of [II] above, the second aspect of this invention can bring about such an unique operation and effect as described below. Namely, in the case of a process of continuous polymerization, by horizontally conveying the HIPE in the shape of a sheet or in the shape of a film and meanwhile polymerizing it at a high rate, the HIPE in the process of polymerization can be prevented from suffering the oil phase and the water phase to deviationally separate in the vertical direction and the HIPE as kept in a stably homogeneized state is enabled to form a porous cross-linked polymer in the shape of a sheet or a film in a brief time.

Further, as regards the compression recited in (b) of (10) in [11] above, by forming the HIPE in the shape of a a sheet or a film and eventually forming a porous cross-linked polymer in the shape of a sheet or a film, the sheet or film allows the exertion of uniform pressure throughout the entire volume thereof during the process of compression, permits the use of numerous conventional compression devices, and warrants the convenience of manipulation. To be more specific, the porous cross-linked polymer in the shape of a sheet or a film, subsequent to dehydration, has only to be passed between a pair of rolls or belts opposed across an interval adjusted in advance as prescribed. The sheet or film generally has the thickness thereof decrease to a certain extent because of the work of compression or the work of aspiration under reduced pressure at the step of dehydration mentioned above. When the sheet or film after the completion of the step of dehydration has a thickness within the specified range, it requires no new provision of the step of compression. The porous cross-linked polymer in the shape of a compressed sheet or film has a small volume as compared with the originally formed porous cross-linked polymer and allows the reduction in the cost of transportation and storage.

Regarding the thickness of formation of the HIPE recited in (2) of [II] mentioned above, since the second aspect of this invention does not have this thickness of formation as an essential constitution, it only requires the porous cross-linked polymer to be in the shape of a sheet or a film and does not always discriminate the HIPE on account of the thickness of formation. The thickness, in the case of a sheet, is not more than 50 mm, preferably not more than 40 mm, more preferably not more than 20 mm, and particularly preferably not more than 10 mm. If this thickness exceeds 50 mm, the excess would be possibly at a disadvantage in preventing the HIPE from being uniformly polymerized throughout the entire volume thereof, imparting uneven solid stage properties to the porous cross-linked polymer, and suffering the HIPE in the process of polymerization to induce discernible phenomenon of water separation.

Next, the third aspect of this invention concerns a method for the production of a porous cross-linked polymer by the steps of mixing an oil phase containing a polymerizing monomer, a cross-linking monomer, and a surfactant as essential components and a water phase containing water as an essential component thereby obtaining an HIPE and polymerizing the HIPE in the presence of a polymerization initiator, which method is characterized in that the HIPE is formed in a thickness of not more than 50 mm or in the shape of a film or a sheet, the polymerization time is within 30 minutes, and the amount of the polymerization initiator which undergoes thorough decomposition within the polymerization time mentioned above is controlled so as to fall in the range of 0.05–2.0 mol % based on the amount of the monomer components. It is provided, however, that when the number of radicals, "n", which are generated by the decomposition of the polymerization initiator exceeds 2 (n>2), the amount of such a decomposed polymerization initiator should be controlled at a value which is n/2 times the amount in the range specified above.

The third aspect of this invention consists in fulfilling, after ① decreasing the thickness of the formed HIPE to not more than 50 mm or ② forming the HIPE in the shape of a film or a sheet, the main constitution that the polymerization is completed in such an unexpectedly very brief time as within 30 minutes, and that the amount of the polymerization initiator to be completely decomposed within the polymerization time is controlled in a range of 0.05–2.0 mol % based on the amount of the monomer components. According to this constitution, the HIPE can be uniformly polymerized throughout the entire volume thereof in a brief time without breaking the emulsified state of the HIPE or inducing the phenomenon of water separation during the process of polymerization and the porous cross-linked polymer is enabled, in spite of the very rapid advance of the polymerization, to retain such mechanical properties as compressive strength to be retained at an excellent level. Further, the method of the third aspect of the invention acquires very high productivity and exceptionally excels in commercial evaluation.

In the third aspect of this invention, the fact that "the HIPE is polymerized in the presence of a polymerization initiator" constitutes itself an essential requirement. Thus, the addition of the polymerization initiator recited in (1) of [II] mentioned above is indispensable and the polymerization of the HIPE necessitates the presence of the polymerization initiator.

The third aspect of this invention consists in controlling the thickness or the shape of the HIPE in the ranges specified above and, in producing the porous cross-linked polymer for such an unusually brief polymerization time as within 30 minutes, controlling the amount of the polymerization initiator to be completely decomposed within the polymerization time mentioned above in the range of 0.05–2.0 mol % based on the amount of the monomer components. The present inventors, after pursuing a diligent study on the relation between the structure of a porous cross-linked polymer and the absorption properties of a foam, have discovered that when the polymerization of the HIPE in the specific thickness or the shape is to be completed in such a brief time as within 30 minutes, a porous cross-linked polymer excellent in absorption properties can be produced without impairing the physical properties of a foam by controlling the amount of the polymerization initiator completely decomposed within the polymerization time mentioned above in the range specified above.

This magnitude, 0.05–2.0 mol %, designates nothing else but the amount of the polymerization initiator which is completely decomposed within the expected polymerization time. So long as this amount is controlled within the range, the total mount of the polymerization initiator to be used does not need to be particularly restricted. If the amount of the polymerization initiator to be completely decomposed within the polymerization time is less than 0.05 mol %, the shortage would be at a disadvantage in not enabling the polymerization to be fully completed within the polymerization time and suffering the produced porous cross-linked polymer to be deficient in physical properties. Conversely, if the amount of the polymerization initiator to be completely decomposed within the polymerization time exceeds 2.0 mol %, the excess would be at a disadvantage in suffering the produced porous cross-linked polymer to incur a large degradation in such mechanical properties as compressive strength due to a decrease in the molecular weight, for example. Though the amount of the polymerization initiator to be completely decomposed within the polymerization time has the optimum value thereof varied with the ratio, W/O, when the polymerization initiator is soluble in water, it is generally controlled preferably in the range of 0.08–0.50 mol %, and more preferably 0.10–0.30 mol %.

Now, the expression "the amount of the polymerization initiator (mol %) to be completely decomposed within the polymerization time" to be used herein will be described below. The amount of the polymerization initiator (mol %) to be completely decomposed within the polymerization time according to this invention can be determined by first determining the amount (mol) of the polymerization initiator to be decomposed and converting the amount so determined into the percentage (mol %) relative to the mol of the monomer components to be used in the polymerization.

The expression "the amount of the decomposed polymerization initiator" as mentioned above refers to the amount of the polymerization initiator which is decomposed within the polymerization time. This amount can be found by ① a method which performs a calculation using the formula for the decomposition rate of the polymerization initiator reported as in a literature and ② a method which, as reported as in a literature, resorts to a calculation using the activating energy of the polymerization initiator in combination with the half-life temperature such as one minute half-life temperature, one hour half-life temperature, 10 hour's half-life temperature, or 100 hour's half-life temperature, i.e. the temperature at which the concentration of the initiator decreases to one half of the original value respectively in one minute, one hour, 10 hours, or 100 hours, for example. This invention carries out the calculation by the method of ① when sodium persulfate, potassium persulfate, or ammonium persulfate is used as the polymerization initiator or by the method of ② when another polymerization initiator is used.

To begin with, the case of using sodium persulfate, potassium persulfate, or ammonium persulfate as the polymerization initiator will be described. The constant, k, of the decomposition rate of the initiator at the polymerization temperature (K) is found by substituting this temperature (K) for the relevant term in the following formula (1) which applies to sodium persulfate and potassium persulfate or in the following formula (2) which applies to ammonium persulfate.

Formula (1):
Constant, k (minute$^{-1}$), of the decomposition rate of the initiator at the temperature (K) for starting polymerization=$60 \times 10^{[12.5-5920/(polymerization\ temperature\ (K))]}$ Formula (2):
Constant, k (minute$^{-1}$), of the decomposition rate of the initiator at the temperature (K) for starting polymerization=$60 \times 10^{[12.7-5830/(polymerization\ temperature\ (K))]}$ The term "polymerization temperature (K)" refers to what is obtained by converting an average polymerization temperature (° C.) between the initial stage of polymerization and the completion of polymerization into an absolute temperature (K) and thus means an average temperature for the total polymerization time including the step of temperature increase. When the temperature for starting polymerization is 60° C., the temperature is increased to 100° C. at a temperature-increasing rate of 20° C./minute, and thereafter the polymerization is continued at 100° C. for 10 minutes (total polymerization time of 12 minutes), for example, the polymerization temperature (K) can be found as follows:

Polymerization temperature (K)=$273+\{(60 \times 2+(100-60) \times 2/2+100 \times 10\}/12=369.7$ (K)

Subsequently, when the constant, k, of the decomposition rate of the initiator at the polymerization temperature (K) is found, the amount of the polymerization initiator to be decomposed can be calculated from the following formula (3), i.e. the relational formula of the constant of the decomposition rate of the initiator, the polymerization time, and the amount of the polymerization initiator charged.

Formula (3):
Amount of decomposed polymerization initiator=(Amount of polymerization initiator charged)$\times\{1-\exp[-($Constant of decomposition rate of initiator, k (minute$^{-1}$))$\times$(Polymerization time (minute))]\}$ When the HIPE formed at 65° C. by using 0.1 mol of potassium persulfate is heated to 95° C. in 1.5 minutes (temperature-increasing rate of 20° C./minute) and, in a state retained at 95° C. for 8.5 minutes, polymerized for 10 minutes including the duration of temperature increase, for example, the polymerization temperature is found to be 365.75 K. Thus, the constant, k, of the decomposition rate of the initiator at this temperature can be found to be 0.0123 (minute$^{-1}$) from the formula (1). Then, the amount of the polymerization initiator to be decomposed at this polymerization temperature over the polymerization time can be calculated to be 0.0116 mol in accordance with the formula (3) mentioned above.

Thus, the amount of the polymerization initiator (mol %) which is completely decomposed within the polymerization time in the present invention can be obtained simply by converting the amount of the polymerization initiator to be decomposed (mol) found as described above into the percentage (mol %) relative to the mol of the monomer components used.

Then, the case of another polymerizing initiator will be described. In this case, the relational formula of the polymerization temperature (K) and the constant, k, of the decomposition rate of the initiator (minute$^{-1}$) equivalent to the following formula 6 can be found for a given initiator by calculating by the relational formula between the activating energy of the polymerization initiator and the one minute half-life temperature, one hour half-life temperature, 10 hour's half-life temperature, or 100's hour half-life temperature reported in a catalog, technical data, or a literature and the following formulas (4) and (5), and the amount of the polymerization initiator to be completely decomposed within the polymerization time can be further calculated on the basis of the formula (3) mentioned above.

Formula (4):
Half-life period (minute) at a prescribed temperature=$1/\{$(Constant, k (minute$^{-1}$), of the decomposition rate of the initiator at the prescribed temperate$\} \times$Ln2

Formula (5):
Ln[(Constant, k (minute$^{-1}$), of the decomposition rate of the initiator)]=LnA-$\{$(Activating energy: Ea(J/mol))/[(Gas constant R (J/mol K))$\times$Polymerization temperature (K))]$\}$ In the formulas mentioned above, R denotes a Gas constant which is 8.3184 (J/mol K), Ln a natural logarithm, and A a constant variable with the kind of polymerization initiator.

Formula 4, when the-half-life temperature in one minute is 100° C. (373 K), for example, represents the relational formula, 1 (minute)=$1/\{$Constant, $k_{373K}$ (minute$^{-1}$), of the decomposition rate of the initiator at 100° C.$\} \times$Ln2. First, the constant, k, of the decomposition rate of the initiator at a prescribed temperature may be calculated by using the formula (4) and then the constant, A, of this polymerization initiator may be calculated in accordance with the formula (5).

For example, t-butylperoxy(2-ethylhexanoate) (made by Nippon Oils & Fats Co., Ltd. and sold under the trademark designation of "Perbutyl O") has been reported to have a 10 hour's half-life temperature of 72.5° C. (345.5 K) and an activating energy of 28.8 kcal/mol (120.56 kJ/mol). In this case, therefore, the calculation using the relational formula of Formula (4) gives the following results:

600 (minute)=$1/\{$constant, $k_{345.5K}$ (minute$^{-1}$), of decomposition rate of the initiator at 345.5 K$\} \times$Ln2 which is calculated as $K_{345.5K}=1.1552 \times 10^{-3}$ (minute$^{-1}$).
Since the relational formula:

Ln(1.1552$\times 10^{-3}$)=LnA-$\{120560/(8.3184 \times 345.5)\}$, can be obtained by substituting the constant, $k_{345.5K}$ (minute$^{-1}$), of the decomposition rate of the initiator at 345.5 K for the relevant term in the formula (5), the constant, A=$1.91 \times 10^{15}$, can be found by calculation for t-butylperoxy (2-ethylhexanoate).

Then, from the relation between the constant A so calculated and the formula (5) mentioned above, the following formula (6) may be derived as the relation between the polymerization temperature (K) and the constant, k (minute$^{-1}$), of the decomposition rate of the initiator existing in the case of t-butylperoxy(2-ethylhexanoate).

Formula (6):

Constant, k, of the decomposition rate of initiator, t-butylperoxy(2-ethylhexanoate)=$1.91\times10^{15}\times\exp\{-120560/[8.3184\times(\text{polymerization temperature, T (K)})]\}$ By finding the constant, k, of the decomposition rate of the initiator from the polymerization temperature, T (K), in accordance with the above formula (6) and substituting this constant for the relevant term of the above formula (3), the amount of the polymerization initiator, t-butylperoxy(2-ethylhexanoate), to be decomposed can be calculated.

As one example, when the HIPE formed at 65° C. by using 2 mols of t-butylperoxy(2-ethylhexanoate) is heated to 95° C. in 1.5 minutes (temperature-increasing rate of 20° C./minute) and, in a state retained at 95° C. for 8.5 minutes, polymerized for 10 minutes including the duration of temperature increase, the polymerization temperature is found to be 365.75 K. Thus, the constant, k, of the decomposition rate of the initiator at this temperature is found to be 0.0118 (minute$^{-1}$) from the formula (6). Then, the amount of the polymerization initiator to be decomposed at this polymerization temperature over the polymerization time is calculated to be 0.223 mol in accordance with the formula (3) mentioned above.

Thus, the amount of the polymerization initiator (mol %) which is completely decomposed within the polymerization time in the present invention can be obtained simply by converting the amount of the polymerization initiator to be decomposed (mol) found as described above into the percentage (mol %) relative to the mol of the monomer components used.

As typical examples of means to control the amount of the polymerization initiator to be completely decomposed within the polymerization time of this invention, the amount of the polymerization initiator to be used, the curing temperature, the rate of temperature increase by heating, and the incorporation of a radical scavenger may be conceivable, although the means does not need to be particularly restricted. Then, when the method described above is not easily applied to a given system in the calculation of the amount of the polymerization initiator to be completely decomposed within the polymerization time, it is allowable to adopt a method of determination or a method of calculation which fits for the occasion.

Incidentally, in the third aspect of this invention, since each the constitutions of the third aspect of this invention are basically as described above with respect to the first and second aspects of this invention, the constitutions except for the following constitutions will be omitted from the following description to avoid useless repetition.

As regards the time for curing by polymerization recited in (7) of [II] mentioned above, the third aspect of this invention has a polymerization time within 30 minutes, preferably within 10 minutes, and more preferably in the range of 1–10 minutes. If the polymerization time exceeds 30 minutes, the excess would be at a commercial disadvantage in impairing the productivity. If it is less than 1 minute, the shortage would be at a disadvantage in possibly imparting insufficient strength to the porous cross-linked polymer. The term "polymerization time" as used herein refers to the total duration which intervenes between the time the polymerization is started and the time the polymerization is completed. Since the time for starting polymerization which forms the start of polymerization (starting point) coincides with the time for starting temperature increase by heating, the total duration, $[t_2-t_0]$, which intervenes between the time the temperature increase by heating is started, $[t_0]$, and the time the polymerization is completed, $[t_2]$, is defined as "time for curing polymer". Since the third aspect of this invention does not include "the temperature increase by heating to a prescribed curing temperature" as an essential element for the construction of this invention, it is not particularly discriminated on account of the relation of $T_0$ and $T_1$ and may be satisfied with any relation, $T_0<T_1$, $T_0=T_1$, or $T_0>T_1$. Further, since the time for starting polymerization which forms the start of polymerization (starting point) cannot be defined as a time for starting the temperature increase by heating, the term, "polymerization time", is defined simply with "starting (starting point)" and "completing (end point)" of the polymerization. The simple term "polymerization time" appearing in the specification may be occasionally used in the broad sense including "time for curing polymer" as well (see Table 1).

Since the relation between $T_0$ and $T_1$ described for the curing temperature recited in (4) of [II] above is not particularly restricted as mentioned above, the third aspect of this invention prefers the difference between the temperature of formation of the HIPE and the curing temperature, $[T_1-T_0]$, to be in the range of −20° C. to 50° C. from the viewpoint of producing the HIPE uniformly. If the temperature difference, $[T_1-T_0]$, is larger on the minus side from −20° C., the polymerization would tend to occur during the formation of the HIPE. If the temperature difference, $[T_1-T_0]$, exceeds 50° C., the excess would demand attention because of its possibility of depriving the HIPE of stability during the course of the temperature increase by heating.

As regards the rate of temperature increase by heating recited in (5) and the time of temperature increase by heating recited in (6) respectively in [II] above, the third aspect of this invention finds neither of these factors as an essential element because the temperature increase by heating constitutes no essential element for the invention. That is, this invention does not always require the rate of temperature increase by heating to be not less than 5° C./minute and the time of temperature increase by heating to be not less than 15 seconds. When the temperature increase by heating is carried out, it is preferable to prevent the rate of temperature increase by heating from exceeding 60° C./minute and it is also preferable to prevent the duration of temperature increase by heating from exceeding 10 minutes.

Next, the method for continuous production of a porous cross-linked polymer according to the fourth aspect of this invention is characterized by the steps of mixing an oil phase containing a polymerizing monomer, a cross-linking monomer, and a surfactant as essential components and a water phase containing water as an essential component thereby obtaining an HIPE, continuously forming the resultant HIPE, preferably on a drive conveying device, then increasing by heating the temperature of the HIPE at a rate of temperature increase of not less than 5° C./minute to a prescribed curing temperature, and thereafter polymerizing the HIPE at the curing temperature.

In the fourth aspect of this invention, the facts that the HIPE is (i) continuously formed, preferably on a drive conveying device; (ii) heated to a prescribed curing temperature at a rate of temperature increase by heating of not less than 5° C./minute; and (iii) cured at the curing temperature constitute itself main elements for construction thereof. According to these elements, the liberation of water observed when the curing is made at a conventional high temperature may not be observed at all. Since the HIPE is continuously cast, it may be easily formed in an uniform thickness throughout the entire volume thereof and sparingly suffered to induce the deviational separation of the oil phase and the water phase after the formation process. Further, even when the rate of temperature increase by heating exceeds 5° C./minute, the HIPE can be uniformly polymerized throughout the entire volume thereof in an unexpectedly brief time without breaking the emulsified state of the HIPE, and the porous cross-linked polymer can acquire excellent physical properties (ability to form an open cell structure, ability to resist against the formation of pinholes and voids, and the like) and in homogeneity throughout the entire volume thereof and can be prevented form the separation of water during the process of polymerization. Since this invention is capable of performing the series of steps for production continuously, it can enjoy very high productivity and veritably excels commercially.

The method for continuous production of a porous cross-linked polymer as mentioned herein is only required to perform a continuous process for forming a porous cross-linked polymer which comprises (i) continuously forming the HIPE, preferably on a drive conveying device, (ii) heating the HIPE to a prescribed curing temperature at a rate of temperature increase by heating of not less than 5° C./minute, and (iii) polymerizing the heated HIPE at the curing temperature. Commercially, the process from the initial preparation of the HIPE through the after-treatment performed subsequently to the formation of a finished porous cross-linked polymer may be preferably carried out continuously.

Incidentally, in the fourth aspect of this invention, since each the constitutions of the fourth aspect of this invention are basically as described above with respect to the first to third aspects of this invention, the constitutions except for the following constitutions will be omitted from the following description to avoid useless repetition.

As respects the thickness of formation and the shape of the HIPE recited in (2) of [II] mentioned above, the fourth aspect of this invention is preferred to decrease the thickness of the formed HIPE to not more than 50 mm or to form the HIPE in the shape of a film or a sheet continuously, preferably on a drive conveying device. When the HIPE is cast on a drive conveying device, it may suffice to cast a HIPE rich in flowability from an emulsifying device onto a drive conveying device by the use of a forming means such as a T-die which is disposed in a perpendicular direction (lateral direction) to the direction of movement.

In the devices for polymerization recited in (8) of [II] above, the fourth aspect of this invention may be applied to a device adapted for continuous polymerization including a belt conveyor which is provided with a means for supplying the HIPE, a means for forming the HIPE, a means for effecting temperature increase by heating, or a means for temperature control may be adopted for the continuous polymerization, though not exclusively. When a drive conveying device is used, a belt conveyor mentioned above forms one of the preferred means for performing continuously a series of steps for polymerization. It is naturally permissible to utilize properly any of the conveying means known heretofore to the art.

Incidentally, the third aspect of this invention described previously may adopt the method for continuous production of a porous cross-linked polymer described in the fourth aspect of this invention. Specifically, the method for continuous production of a porous cross-linked polymer contemplated by the third aspect of this invention is characterized by carrying out continuously a series of steps from the formation through the polymerization of the HIPE. Accordingly, the operations and the effects which can be obtained by the third aspect of this invention and the fourth aspect of this invention can be obtained as combined synergistically.

Incidentally, the method for continuous production of a porous cross-linked polymer according to the third aspect of this invention is only required to perform continuously "the step (operation) of forming the HIPE" and "the step (operation) for polymerizing the HIPE at a curing temperature and consequently forming a porous cross-linked polymer". Commercially, this operation may be preferably carried out continuously from the initial preparation of the HIPE through the after-treatment which is performed subsequently to the formation of a finished porous cross-linked polymer.

Incidentally, in the third aspect of this invention, since the elements for the construction of the method for continuous production of a porous cross-linked polymer are basically as described above with respect to the first to fourth aspects of this invention, they will be omitted from the following description to avoid useless repetition.

Next, the fifth aspect of this invention concerns a method for the production of a porous cross-linked polymer by the steps of mixing an oil phase containing a polymerizing monomer, a cross-linking monomer, and a surfactant as essential components and a water phase having water as an essential component thereby obtaining a water in oil type high internal phase emulsion and increasing the temperature of the emulsion by heating to a prescribed curing temperature thereby polymerizing the emulsion, which method is characterized in that the emulsion is formed in a thickness of not more than 50 mm or in the shape of a film or a sheet and the temperature increase of the emulsion is effected by the use of an active thermal energy ray.

The fifth aspect of this invention, by ① decreasing the thickness of the formed HIPE to not more than 50 mm or ② forming the HIPE in the shape of a film or a sheet and thereafter using an active thermal energy ray as a means for temperature increase by heating, permits to complete the polymerization of the HIPE in an unusually brief time. Consequently, the HIPE can be uniformly polymerized throughout the entire volume thereof in a brief time without breaking the emulsified state of the HIPE and the porous cross-linked polymer is enabled to acquire homogeneous physical properties and prevent the phenomenon of water separation during the course of polymerization. This process affords very high productivity and proves highly excellent from the commercial point of view.

Incidentally, in the fifth aspect of this invention, since each the constitutions of the fifth aspect of this invention are basically as described above with respect to the first to fourth aspects of this invention, the constitutions except for the following constitutions will be omitted from the following description to avoid useless repetition.

In the device for polymerization recited in (8) of [II] above, the fifth aspect of this invention is indispensably required to use an active thermal energy ray as a means for the temperature increase by heating. The term "active thermal energy ray" as used herein refers to a far infrared ray (an electromagnetic wave of 20 $\mu$m–1 mm in wavelength in an infrared ray from a red color terminal of a visible ray through a millimeter wave of a microwave) and a near infrared ray (an electromagnetic wave of 0.75 $\mu$m–20 mm in wavelength in an infrared ray from a red color terminal of the visible ray through a millimeter wave of the microwave) which are capable of utilizing the radiation energy (a thermal action that an infrared ray externally injected into a given substance is effectively absorbed in the substance and enabled to heighten the temperature of the substance by inducing an electromagnetic resonance with the atoms of the substance) and a microwave (an electromagnetic wave of 1 meter–several millimeters in wavelength and 300–some ten thousands of MHz in frequency) which is capable of utilizing a high frequency dielectric heating (which uses a phenomenon that an insulating substance in a high frequency electric field (several MHz to several GHz) generates heat through dissipation loss and brings the advantage of enabling a given substance to be heated from the interior forward), for example. Particularly from the viewpoint of heightening the rate of temperature increase, it is commendable to use a near infrared ray which has high permeability, low heat loss, high energy efficiency, allows adoption of a simple device, and fits for the conveyor production (continuous polymerization). The near infrared ray is particularly effective in performing rapid temperature increase for the purpose of accomplishing the rate of temperature increase by heating of not less than 5° C./minute or when the curing temperature aimed at exceeds 85° C.

Next, the method for continuous production of a porous cross-linked polymer according to the sixth aspect of this invention is characterized by the steps of mixing an oil phase containing a polymerizing monomer, a cross-linking monomer, and a surfactant as essential components and a water phase containing water as an essential component thereby obtaining a water in oil type high internal phase emulsion, continuously forming the emulsion, preferably on a drive conveying device, then increasing the temperature of the emulsion by heating by the use of an active thermal energy ray, and polymerizing the emulsion at a curing temperature.

In the sixth aspect of this invention, the fact that the HIPE is (i) continuously formed, preferably on a drive conveying device, (ii) heated rapidly to a prescribed curing temperature by the use of an active thermal energy ray as a temperature-increasing means fit for the rapid temperature increase by heating, and (iii) cured at the curing temperature constitutes itself a main element for construction thereof. According to this element, this aspect of the invention can obtain the actions and the effects obtained by the fourth aspect of this invention and the fifth aspect of this invention synergistically.

Incidentally, in the sixth aspect of this invention, since each the constitutions of the sixth aspect of this invention are basically as described above with respect to the first to fifth aspects (particularly the fourth and fifth aspects) of this invention, the constitutions except for the following constitutions will be omitted from the following description to avoid useless repetition.

EXAMPLES

Now, this invention will be described more specifically below with reference to working examples. The properties of porous cross-linked polymers mentioned in the following working examples were measured and evaluated as follows.
<Degree of Water Separation and Surface Condition of Porous Cross-linked Polymer>

The degree of water separation of a given porous cross-linked polymer was found by separating free water existing in the proximity of the porous cross-linked polymer and not restrained by the porous cross-linked polymer during the extraction of the formed porous cross-linked polymer from the polymerization vessel, weighing the separated free water, calculating the mass ratio (%) of the water liberated during the polymerization, and reporting the magnitude thus found as the degree of water separation.

<Residual Monomer Content>

The residual monomer content in a given porous cross-linked polymer was found by adding 1.0 g of the porous cross-linked polymer to 200 g of methylene chloride, stirring them together for two hours, then filtering the resultant mixture, concentrating the filtrate to dryness with an evaporator, dissolving the concentrated filtrate in an acetonitrile/water mixture (volume ratio of 80/20), and measuring the concentration of each the residual monomer components by means of liquid chromatography.
<Compressive Strength>

The compressive strength of a given porous cross-linked polymer was found by measuring the uniaxial (in the direction of thickness) compressive strength of the polymer at 24° C. by the use of a testing device (made by Instron Corp. and sold under the trademark designation of "Instron 1186-RE5500") and converting the result of measurement to the international unit (kPa).

Example 1

In a cylindrical vessel furnished with a stirrer, a monomer component formed of 3.0 parts by mass (hereinafter referred to simply as "part(s)") of 2-ethylhexyl acrylate and 1.8 parts of 55% divinyl benzene (using p-ethyl-vinyl, benzene as the remainder) and 0.25 part of sorbitan monooleate as an oil-soluble surfactant were placed and uniformly dissolved to prepare an oil phase mixture solution (hereinafter referred to as "oil phase"). Separately, 3 parts of calcium chloride was dissolved in 150 parts of deionized water to prepare a water phase aqueous solution (hereinafter referred to as "water phase") and this aqueous solution was heated to 55° C. The oil phase was kept stirred at 55° C. and the water phase adjusted in advance to 55° C. was added to the stirred oil phase over a period of five minutes. After completion of this addition, the stirring of the two phases was continued for 10 minutes to obtain a stable water in oil type high internal phase emulsion (HIPE) having a W/O ratio of 45/1. The emulsion and a solution of 0.1 part of potassium persulfate as a water-soluble polymerization initiator in 10 parts of deionized water added thereto were stirred together for two minutes. The resultant HIPE was cast into a rectangular polymerization vessel made of stainless steel and measuring 1100 mm in length, 100 mm in width, and 5 mm in thickness so as to form a sheet thereof and, with a thermocouple immersed therein (the thermocouple so inserted in the HIPE in the state yet to be cured and assuming the constitution of yogurt as to occupy a position in the central part of the vessel; similarly applicable herein below) and an upper lid set in place on the vessel, the vessel containing the HIPE was immersed in a hot water bath at 97° C. The temperature of the HIPE reached 95° C. (curing temperature) in 1.5 minutes after the time of immersion in the hot water bath (the time for starting temperature increase). The rate of this temperature increase by heating was 27° C./minute.

The vessel was pulled out of the hot bath seven minutes after the start of the temperature increase by heating and dipped in an ice bath to stop the polymerization proceeding in the vessel, to obtain a cured porous cross-linked polymer (1). The amount of the polymerization initiator which was completely decomposed during the seven minutes was 0.083 mol % (relative to the monomer components). The porous cross-linked polymer (1) was extracted from the vessel, examined to determine the degree of water separation and the surface condition, and then tested for the residual monomer content and the compressive strength. The results are shown in Table 1 below.

Example 2

A porous cross-linked polymer (2) was obtained by following the procedure of Example 1 while the polymerization vessel was pulled out of the hot bath 10 minutes after the start of the temperature increase by heating. The amount of the polymerization initiator which was completely decomposed during the ten minutes was 0.133 mol % (relative to the monomer components). The porous cross-linked polymer (2) was extracted from the vessel, examined to determine the degree of water separation and the surface condition, and then tested for the residual monomer content and the compressive strength. The results are shown in Table 1 below.

Example 3

The HIPE prepared by the same procedure as in Example 1 was cast into a rectangular polymerization vessel made of stainless steel and measuring 1100 mm in length, 30 mm in width, and 5 mm in thickness and the vessel containing the HIPE, with a thermocouple inserted therein and an upper lid set in place, was immersed in a hot water bath at 97° C. The temperature of the HIPE reached 95° C. (curing temperature) in 0.75 minute after the time of immersion in the hot water bath (the time for starting the temperature increase). The rate of temperature increase by heating was 53° C./minute.

The vessel was pulled out of the hot bath ten minutes after the start of the temperature increase by heating and dipped in an ice bath to stop the polymerization proceeding in the vessel to obtain a cured porous cross-linked polymer (3). The amount of the polymerization initiator which was completely decomposed during the ten minutes was 0.154 mol % (relative to the monomer components). The porous ross-linked polymer (3) was extracted from the vessel, examined to determine the degree of water separation and the surface condition, and then tested for the residual monomer content and the compressive strength. The results are shown in Table 1 below.

Example 4

The HIPE prepared by the same procedure as in Example 1 was cast into a rectangular polymerization vessel made of stainless steel and measuring 1100 mm in length, 100 mm in width, and 20 mm in thickness and the vessel containing the HIPE, with a thermocouple inserted therein and an upper lid set in place, was immersed in a hot water bath at 97° C. The temperature of the HIPE reached 95° C. (curing temperature) in three minutes after the time of immersion in the hot water bath (the time for starting the temperature increase). The rate of temperature increase by heating was 13° C./minute.

The vessel was pulled out of the hot bath ten minutes after the start of the temperature increase by heating and dipped in an ice bath to stop the polymerization proceeding in the vessel to obtain a cured porous cross-linked polymer (4). The amount of the polymerization initiator which was completely decomposed during the ten minutes was 0.099 mol % (relative to the monomer components). The porous cross-linked polymer (4) was extracted from the vessel, examined to determine the degree of water separation and the surface condition, and then tested for the residual monomer content and the compressive strength. The results are shown in Table 1 below.

Example 5

In a cylindrical vessel furnished with a stirrer, a monomer component formed of 3.0 parts of 2-ethylhexyl acrylate and 1.8 parts of 55% divinyl benzene (using p-ethyl-vinyl benzene as the remainder) and 0.25 part of sorbitan monooleate as an oil-soluble surfactant were placed and were uniformly dissolved to prepare an oil phase. Separately, 3 parts of calcium chloride was dissolved in 150 parts of deionized water to prepare a water phase and this water phase was heated to 65° C. The oil phase was kept stirred at 65° C. and the water phase adjusted in advance to 65° C. was added to the stirred oil phase over a period of five minutes. After completion of this addition, the stirring of the two phases was continued for 10 minutes to obtain a stable water in oil type high internal phase emulsion (HIPE) having a W/O ratio of 45/1. The emulsion and a solution of 0.1 part of potassium persulfate as a water-soluble polymerization initiator in 10 parts of deionized water added thereto were stirred together for two minutes. The resultant HIPE was cast into a rectangular polymerization vessel made of stainless steel and measuring 1100 mm in length, 100 mm in width, and 5 mm in thickness and, with a thermocouple immersed therein and an upper lid set in place on the vessel, the vessel containing the HIPE was immersed in a hot water bath at 98° C. The temperature of the HIPE reached 95° C. (curing temperature) in 1.5 minutes after the time of immersion in the hot water bath (the time for starting temperature increase). The rate of this temperature increase by heating was 20° C./minute.

The vessel was pulled out of the hot bath ten minutes after the start of the temperature increase by heating and dipped in an ice bath to stop the polymerization proceeding in the vessel to obtain a cured porous cross-linked polymer (5). The amount of the polymerization initiator which was completely decomposed during the ten minutes was 0.143 mol % (relative to the monomer components). The porous cross-linked polymer (5) was extracted from the vessel, examined to determine the degree of water separation and the surface condition, and then tested for the residual monomer content and the compressive strength. The results are shown in Table 1 below.

Example 6

A porous cross-linked polymer (6) was obtained by following the procedure of Example 5 while changing 0.1 part of potassium persulfate to 0.25 part of sodium persulfate and pulling the vessel five minutes after the start of temperature increase by heating. The amount of the polymerization initiator which was completely decomposed during the five minutes was 0.167 mol % (relative to the monomer component). The porous cross-linked polymer (6) was extracted from the vessel, examined to determine the degree of water separation and the surface condition, and then tested for the residual monomer content and the compressive strength. The results are shown in Table 1 below.

Example 7

A porous cross-linked polymer (7) was obtained by following the procedure of Example 5 while changing 0.1 part of potassium persulfate to 0.25 part of sodium persulfate, casting the formed HIPE in a rectangular polymerization vessel made of PET and measuring 1100 mm in length, 100 mm in width, and 20 mm in thickness and immersing the vessel containing the HIPE in a hot water bath at 98° C., with a thermocouple inserted in the HIPE and an upper lid set in place. In this example, The temperature of the HIPE reached 95° C. (the curing temperature) in 3.0 minutes after the time of immersion in the hot water bath (the time for starting temperature increase). The rate of temperature increase by heating was 10° C./minute.

The vessel was pulled out of the hot bath seven minutes after the start of the temperature increase by heating and dipped in an ice bath to stop the polymerization proceeding in the vessel to obtain a cured porous cross-linked polymer (7). The amount of the polymerization initiator which was completely decomposed during the seven minutes was 0.264 mol % (relative to the monomer components). The porous cross-linked polymer (7) was extracted from the vessel, examined to determine the degree of water separation and the surface condition, and then tested for the residual monomer content and the compressive strength. The results are shown in Table 1 below.

Example 8

An oil phase was prepared by adding 0.25 part of sorbitan monooleate as an oil-soluble surfactant to a monomer component formed of 3.0 parts of 2-ethylhexyl acrylate and 1.8 parts of 55% divinyl benzene (using p-ethyl-vinyl benzene as the remainder) and uniformly dissolving them. Separately, a water phase was prepared by dissolving 3 parts of calcium chloride and 0.1 part of potassium persulfate as a water-soluble polymerization initiator in 150 parts of deionized water and this water phase was heated to 65° C. The oil phase and the water phase were supplied continuously at a W/O ratio of 45/1 into a stirring device and mixed emulsified therein as kept at 65° C. The water in oil type high internal phase emulsion (HIPE) consequently formed was continuously extracted from the stirring device and then supplied (formed) continuously in the shape of a sheet measuring approximately 50 cm in width and 5 mm in thickness onto a belt installed horizontally and kept in motion at a fixed rate. The HIPE was polymerized by being passed through a polymerization zone controlled at about 90° C. over a period of about 20 minutes, to obtain a porous cross-linked polymer (8). The amount of the polymerization initiator which was completely decomposed in this porous cross-linked polymer (8) was about 0.18 mol % (relative to the monomer components). In this continuous polymerization device, The temperature of the HIPE reached 90° C. (curing temperature) three minutes after the time the HIPE was conveyed into the polymerization zone (the time for starting temperature increase). The rate of temperature increase of the HIPE by heating was 8.3° C./minute. The porous cross-linked polymer (8) was extracted from the device, examined to determine the degree of water separation and the surface condition and then tested for the residual monomer content and the compressive strength. The results are shown in Table 1 below.

Example 9

An oil phase was prepared by adding 25 parts of sorbitan monooleate as an oil-soluble surfactant to a monomer component formed of 300 parts of 2-ethylhexyl acrylate and 180 parts of 55% divinyl benzene (using p-ethyl-vinyl benzene as the remainder) and uniformly dissolving them. Separately, a water phase was prepared by dissolving 3 parts of calcium chloride and 10 parts of potassium persulfate as a water-soluble polymerization initiator in 15000 parts of deionized water and this water phase was heated to 65° C. The oil phase and the water phase were supplied continuously at a W/O ratio of 45/1 into a stirring device and mixed emulsified therein as kept at 65° C. The water in oil type high internal phase emulsion (HIPE) consequently formed was continuously extracted from the stirring device and then supplied (formed) continuously in the shape of a sheet measuring approximately 50 cm in width and 5 mm in thickness onto a belt installed horizontally and kept in motion at a fixed rate. The HIPE was polymerized by being passed through a near infrared furnace having an output of 11 kW over a period of about two minutes and through a polymerization zone controlled at about 95° C. over a period of about eight minutes, to obtain a porous cross-linked polymer (9). In this continuous polymerization device, the temperature of the HIPE reached 95° C. (curing temperature) about 1.5 minutes after the time the HIPE was conveyed into the polymerization zone (the time for starting temperature increase). The rate of temperature increase of the HIPE by heating was 20° C./minute. The amount of the polymerization initiator which was completely decomposed in this porous cross-linked polymer (9) was about 0.143 mol %. The porous cross-linked polymer (9) was extracted from the device, examined to determine the degree of water separation and the surface condition and then tested for the residual monomer content and the compressive strength. The results are shown in Table 1 below.

Example 10

An oil phase was prepared by adding 25 parts of sorbitan monooleate as an oil-soluble surfactant to a monomer component formed of 300 parts of 2-ethylhexyl acrylate and 180 parts of 55% divinyl benzene (using p-ethyl-vinyl benzene as the remainder) and uniformly dissolving them. Separately, a water phase was prepared by dissolving 3 parts of calcium chloride and 25 parts of potassium persulfate as a water-soluble polymerization initiator in 15000 parts of deionized water and this water phase was heated to 65° C. The oil phase and the water phase were supplied continuously at a W/O ratio of 45/1 into a stirring device and mixed emulsified therein as kept at 65° C. The water in oil type high internal phase emulsion (HIPE) consequently formed was continuously extracted from the stirring device and then supplied (formed) continuously in the shape of a sheet measuring approximately 50 cm in width and 5 mm in thickness onto a belt installed horizontally and kept in motion at a fixed rate. The HIPE was polymerized by being passed through a near infrared furnace having an output of 13 kW over a period of about one minute and through a polymerization zone controlled at about 95° C. over a period of about four minutes, to obtain a porous cross-linked polymer (10). In this continuous polymerization device, the temperature of the HIPE reached 95° C. (curing temperature) about 1.5 minutes after the time the HIPE was conveyed into the polymerization zone (the time for starting temperature increase). The rate of temperature increase of the HIPE by heating was 20° C./minute. The amount of the polymerization initiator which was completely decomposed in this porous cross-linked polymer (10) was about 0.406 mol %. The porous cross-linked polymer (10) was extracted from the device, examined to determine the degree of water separation and the surface condition and then tested for the residual monomer content and the compressive strength. The results are shown in Table 1 below.

Example 11

In a cylindrical vessel furnished with a stirrer, a monomer component formed of 3.0 parts of 2-ethylhexyl acrylate and 1.8 parts of 55% divinyl benzene (using p-ethyl-vinyl benzene as the remainder) and 0.25 part of sorbitan monooleate as an oil-soluble surfactant were placed and were uniformly dissolved, to prepare an oil phase mixture solution. Separately, 9 parts of calcium chloride was dissolved in 208.2 parts of deionized water to prepare a water phase aqueous solution and this aqueous solution was heated to 55° C. The oil phase was kept stirred at 55° C. and the water phase adjusted in advance to 55° C. was added to the stirred oil phase over a period of five minutes. After completion of this addition, the stirring of the two phases was continued for 10 minutes to obtain a stable water in oil type high internal phase emulsion (HIPE) having a W/O ratio of 45/1. The HIPE and an aqueous solution containing 0.1 part of potassium persulfate as a water-soluble polymerization initiator dissolved in 10 parts of deionized water added thereto were stirred together for two minutes. The resultant HIPE was cast into a rectangular polymerization vessel made of stainless steel and measuring 1100 mm in length, 100 mm in width, and 5 mm in thickness so as to form a sheet thereof and, with a thermocouple immersed therein and an upper lid set in place on the vessel, the vessel containing the HIPE was immersed in a hot water bath at 97° C. The temperature of the HIPE reached 95° C. (curing temperature) in 1.5 minutes after the time of immersion in the hot water bath (the time for starting temperature increase). The rate of this temperature increase by heating was 27° C./minute.

The vessel was pulled out of the hot bath seven minutes after the start of the temperature increase by heating and dipped in an ice bath to stop the polymerization proceeding in the vessel to obtain a cured porous cross-linked polymer (11). The amount of the polymerization initiator which was completely decomposed during the seven minutes was 0.083 mol % (relative to the monomer components). The porous cross-linked polymer (11) was extracted from the vessel, examined to determine the degree of water separation and the surface condition, and then tested for the residual monomer content and the compressive strength. The results are shown in Table 1 below.

Example 12

A porous cross-linked polymer (12) was obtained by following the procedure of Example 11 while the polymerization vessel was pulled out of the hot bath 10 minutes after the start of the temperature increase by heating. The amount of the polymerization initiator which was completely decomposed during the ten minutes was 0.133 mol % (relative to the monomer components). The porous cross-linked polymer (12) was extracted from the vessel, examined to determine the degree of water separation and the surface condition, and then tested for the residual monomer content and the compressive strength. The results are shown in Table 1 below.

Example 13

In a cylindrical vessel furnished with a stirrer, a monomer component formed of 3.0 parts of 2-ethylhexyl acrylate and 1.8 parts of 55% divinyl benzene (using p-ethyl-vinyl benzene as the remainder) and 0.25 part of sorbitan monooleate as an oil-soluble surfactant were placed and were uniformly dissolved to prepare an oil phase mixture solution. Separately, 9 parts of calcium chloride was dissolved in 218.2 parts of deionized water to prepare a water phase aqueous solution and this aqueous solution was heated to 55° C. The oil phase was kept stirred at 55° C. and the water phase adjusted in advance to 55° C. was added to the stirred oil phase over a period of five minutes. After completion of this addition, the stirring of the two phases was continued for 10 minutes to obtain a stable water in oil type high internal phase emulsion (HIPE) having a W/O ratio of 45/1. The HIPE and 0.1 part of t-butyl peroxy(2-ethylhexanoate) as an oil-soluble polymerization initiator added thereto were stirred together for two minutes. The resultant HIPE was cast into a rectangular polymerization vessel made of stainless steel and measuring 1100 mm in length, 100 mm in width, and 5 mm in thickness and, with a thermocouple immersed therein and an upper lid set in place on the vessel, the vessel containing the HIPE was immersed in a hot water bath at 97° C. The temperature of the HIPE reached 95° C. (curing temperature) in 0.4 minute after the time of immersion in the hot water bath (the time for starting temperature increase). The rate of this temperature increase by heating was 27° C./minute.

The vessel was pulled out of the hot bath seven minutes after the start of the temperature increase by heating and dipped in an ice bath to stop the polymerization proceeding in the vessel to obtain a cured porous cross-linked polymer (13). The amount of the polymerization initiator which was completely decomposed during the seven minutes was 0.099 mol % (relative to the monomer components). The porous cross-linked polymer (13) was extracted from the vessel, examined to determine the degree of water separation and the surface condition, and then tested for the residual monomer content and the compressive strength. The results are shown in Table 1 below.

Comparative Example 1

About 450 ml of the HIPE obtained by the procedure of Example 1 as containing a polymerization initiator and kept at 65° C. was poured into a cylindrical vessel made of polypropylene and measuring 90 mm in diameter (having an inner volume of 500 ml) and the vessel containing the HIPE was immersed in a hot water bath at 98° C., with a thermocouple immersed in the central part of the vessel and an upper lid set in place. The HIPE had a thickness of about 80 mm. The temperature of the HIPE reached 90° C. (the curing temperature) in 90 minutes after the time for immersion in the hot water (the time for starting temperature increase). The rate of temperature increase by heating at 0.28° C./minute.

The procedure described above was repeated. The vessel was pulled out of the hot water bath 10 minutes after the start of temperature increase by heating (after a total of 10 minutes) and was dipped in ice bath to stop the polymerization proceeding in the vessel to obtain a porous cross-linked polymer (1) for comparison. The amount of the polymerization initiator which was completely decomposed during the ten minutes was 0.0084 mol % (relative to the monomer components). This porous cross-linked polymer (1) for comparison was in the form of soft yogurt, indicating that the residual monomer was not thoroughly polymerized to 55%. It could not be tested for the other properties. The results are as shown in Table 1 below.

Comparative Example 2

About 450 ml of the HIPE obtained by the procedure of Example 1 as containing a polymerization initiator and kept at 65° C. was poured into a cylindrical vessel made of polypropylene and measuring 90 mm in diameter (having an inner volume of 500 ml) and the vessel containing the HIPE was immersed in a hot water bath at 98° C., with a thermocouple immersed in the central part of the vessel and an upper lid set in place. The HIPE had a thickness of about 80 mm. The HIPE reached 90° C. (curing temperature) in 90 minutes after the time for immersion in the hot water (the time for starting temperature increase). The rate of temperature increase by heating at 0.28° C./minute.

The vessel was pulled out of the hot water bath 120 minutes after the start of temperature increase by heating and was dipped in ice bath to stop the polymerization proceeding in the vessel to obtain a porous cross-linked polymer (2) for comparison. The amount of the polymerization initiator which was completely decomposed during the 120 minutes was 0.417 mol % (relative to the monomer component). This porous cross-linked polymer (2) for comparison was examined to determine the degree of water separation and the surface condition and then tested for the residual monomer content and the compressive strength. The results are as shown in Table 1 below.

Comparative Example 3

About 450 ml of the HIPE obtained by following the procedure of Example 1 was poured into a cylindrical vessel made of polypropylene and measuring 90 mm in diameter (having an inner volume of 500 ml). The HIPE had a thickness of about 80mm. The vessel, with a thermocouple inserted in the central part and an upper lid set in place thereon, was heated for temperature increase at a high frequency output of 500 W in a device adapted to generate a microwave of 2450 MHz using an oscillator operated by a continuous output magnetron. Since this device selectively heated the water contained in the HIPE, a considerable amount of the water boiled before the interior of the HIPE reached 90° C. and the HIPE collapsed. Thus, the operation was discontinued four minutes after the start of the temperature increase by heating.

TABLE 1

|  |  | Forming Temperature of HIPE (° C.) | Thickness of HIPE During Polymerization (mm) | Time for Temperature Increase by Heating ($t_1-t_0$) (minute) | Rate of Temperature Increase by Heating (° C./minute) | Curing Temperature ($T_1$) (° C.) |
|---|---|---|---|---|---|---|
| Example 1 | Porous Cross-linked Polymer (1) | 55 | 5 | 1.5 | 27 | 95 |
| Example 2 | Porous Cross-linked Polymer (2) | 55 | 5 | 1.5 | 27 | 95 |
| Example 3 | Porous Cross-linked Polymer (3) | 55 | 5 | 0.75 | 53 | 95 |
| Example 4 | Porous Cross-linked Polymer (4) | 55 | 20 | 3 | 13 | 95 |
| Example 5 | Porous Cross-linked Polymer (5) | 65 | 5 | 1.5 | 20 | 95 |
| Example 6 | Porous Cross-linked Polymer (6) | 65 | 5 | 1.5 | 20 | 95 |
| Example 7 | Porous Cross-linked Polymer (7) | 65 | 20 | 3 | 10 | 95 |
| Example 8 | Porous Cross-linked Polymer (8) | 65 | about 5 | 3 | 8.3 | 90 |
| Example 9 | Porous Cross-linked Polymer (9) | 65 | 5 | 1.5 | 20 | 95 |
| Example 10 | Porous Cross-linked Polymer (10) | 65 | 5 | 1.5 | 20 | 95 |
| Example 11 | Porous Cross-linked Polymer (11) | 55 | 5 | 1.5 | 27 | 95 |
| Example 12 | Porous Cross-linked Polymer (12) | 55 | 5 | 1.5 | 27 | 95 |
| Example 13 | Porous Cross-linked Polymer (13) | 55 | 5 | 1.5 | 27 | 95 |
| Comparative Example 1 | Porous Cross-linked Polymer for comparison (1) | 65 | 80 | 10 | 0.28 | — |
| Comparative Example 2 | Porous Cross-linked Polymer for comparison (2) | 65 | 80 | 90 | 0.28 | 90 |
| Comparative Example 3 | Porous Cross-linked Polymer for comparison (3) | 55 | 80 | 4 | — | — |

|  |  | Polymerization Time (minute) | Degree of water Separation (%) | Surface Condition of Porous Cross-linked Polymer | Residual Monomer Content (%) | Compressive Strength (kpa) |
|---|---|---|---|---|---|---|
| Example 1 | Porous Cross-linked Polymer (1) | 7 | 2 | Uniform | <0.1 | 8.3 |
| Example 2 | Porous Cross-linked Polymer (2) | 10 | 3 | Uniform | <0.1 | 9.0 |
| Example 3 | Porous Cross-linked Polymer (3) | 10 | 3 | Uniform | <0.1 | 8.3 |
| Example 4 | Porous Cross-linked Polymer (4) | 10 | 2 | Uniform | <0.1 | 8.3 |
| Example 5 | Porous Cross-linked Polymer (5) | 10 | 2 | Uniform | <0.1 | 9.0 |
| Example 6 | Porous Cross-linked Polymer (6) | 5 | 3 | Uniform | <0.1 | 8.3 |
| Example 7 | Porous Cross-linked Polymer (7) | 5 | 4 | Uniform | <0.1 | 8.3 |
| Example 8 | Porous Cross-linked Polymer (8) | 10 | 3 | Uniform | <0.1 | 8.3 |
| Example 9 | Porous Cross-linked Polymer (9) | 10 | 3 | Uniform | <0.1 | 8.3 |
| Example 10 | Porous Cross-linked Polymer (10) | 5 | 2 | Uniform | <0.1 | 8.3 |
| Example 11 | Porous Cross-linked Polymer (11) | 7 | 2 | Uniform | <0.1 | 9.0 |
| Example 12 | Porous Cross-linked Polymer (12) | 10 | 2 | Uniform | <0.1 | 9.1 |
| Example 13 | Porous Cross-linked Polymer (13) | 7 | 3 | Uniform | <0.1 | 9.0 |
| Comparative Example 1 | Porous Cross-linked Polymer for comparison (1) | 10 | Unpolymerized | Unpolymerized Yogurt-like | 55 | Not determined |
| Comparative Example 2 | Porous Cross-linked Polymer for comparison (2) | 120 | 5 | Uniform | <0.1 | 9.0 |
| Comparative Example 3 | Porous Cross-linked Polymer for comparison (3) |  |  | Collapse of HIPE |  |  |

INDUSTRIAL APPLICABILITY

This invention permits the polymerization of an HIPE in such an exceptionally brief time as not more than 30 minutes, preferably not more than 10 minutes, without breaking the emulsified state of the HIPE. Thus, the HIPE is enabled to retain the emulsified state stably and to produce with high efficiency a porous cross-linked polymer excelling in absorption properties.

The method for production of this invention is capable of producing a porous cross-linked polymer by continuous polymerization with very high productivity and, therefore, is excellent from the commercial point of view.

The entire disclosure of Japanese Patent Application No. 11-290141 filed on Oct. 12, 1999 including specification,

What is claimed is:

1. A method for the continuous production of a porous cross-linked polymer which comprises steps of mixing an oil phase containing a polymerizing monomer, a cross-linking monomer, and a surfactant as essential components with a water phase containing water as an essential component thereby obtaining a water-in-oil type high internal phase emulsion and heating said emulsion to a prescribed curing temperature thereby polymerizing the emulsion, wherein said emulsion is continuously formed in a thickness of not more than 50 mm or in the shape of a film or a sheet, the temperature-increasing rate of the emulsion is not less than 5° C./minute, and a curing temperature is 80 to 110° C.

2. A method for the production of a porous cross-linked polymer according to claim 1, wherein said temperature-increasing rate of the emulsion is in the range of 5 to 60° C./minute.

3. A method for the production of a porous cross-linked polymer according to claim 1, wherein the difference between the temperature for formation of said emulsion and the curing temperature of said emulsion is in the range of 2 to 50° C.

4. A method for the production of a porous cross-linked polymer according to claim 1, wherein the temperature for formation of said emulsion is in the range of 40 to 95° C.

5. A method for the continuous production of a porous cross-linked polymer according to claim 1, wherein the curing time of said emulsion is in the range of 1 to 10 minutes.

6. a method for the continuous production of a porous cross-linked polymer according to claim 1, wherein said emulsion further contains a polymerization initiator, the amount of the initiator which decomposes within the polymerization time of said emulsion is 0.08 to 0.5 mol % of the amount of the monomer component.

7. A method for the production of a porous cross-linked polymer which comprises steps of mixing an oil phase containing a polymerizing monomer, a cross-linking monomer, and a surfactant as essential components with a water phase containing water as an essential component thereby obtaining a water-in-oil type high internal phase emulsion and polymerizing said emulsion in the presence of a polymerization initiator, wherein said emulsion is formed in the shape of a film or a sheet, the curing temperature is 80 to 110° C., the polymerization time is within 30 minutes, and the amount of the polymerization initiator which undergoes thorough decomposition within said polymerization time is controlled so as to fall within the range of 0.08 to 0.5 mol % based on the amount of the monomer components.

8. A method for the continuous production of a porous cross-linked polymer which comprises steps of mixing an oil phase containing a polymerizing monomer, a cross-linking monomer, and a surfactant as essential components with a water phase containing water as an essential component thereby obtaining a water-in-oil type high internal phase emulsion and polymerizing said emulsion in the presence of a polymerization initiator, wherein said emulsion is continuously subjected to a series of operations continuing from the step of forming through the step of polymerizing, said emulsion is formed in the shape of a film or a sheet the curing temperature is 80 to 110° C., the polymerization time is within 30 minutes, and the amount of the polymerization initiator, which undergoes thorough decomposition within said polymerization time, is controlled so as to fall within the range of 0.08 to 0.5 mol % based on the amount of the monomer components.

9. A method for the continuous production of a porous cross-linked polymer which comprises steps of mixing an oil phase containing a polymerizing monomer, a cross-linking monomer, and a surfactant as essential components with a water phase containing water as an essential component thereby obtaining a water-in-oil type high internal phase emulsion, wherein said emulsion is formed in the shape of a film or a sheet, a rate of temperature increase of said emulsion is not less than 5° C./minute, curing time is within 30 minutes, and a polymerization initiator, the amount of the initiator, which undergoes through decomposition within said polymerization time, being 0.08 to 0.5 mol % of the amount of the monomer component.

10. A method for the production of a porous cross-linked polymer which comprises steps of mixing an oil phase containing a polymerizing monomer, a cross-linking monomer, and a surfactant as essential components with a water phase containing water as an essential component thereby obtaining a water in oil type high internal phase emulsion, increasing the temperature of said emulsion to a prescribed curing temperature, and polymerizing the emulsion at the curing temperature, wherein said emulsion is formed in a thickness of not more than 50 mm or in the shape of a film or a sheet, and said emulsion is heated for temperature increase by the use of an active thermal energy ray.

11. A method for the production of a porous cross-linked polymer according to claim 10, wherein said active thermal energy ray is a near infrared ray.

12. A method for the continuous production of a porous cross-linked polymer, which comprises steps of mixing an oil phase containing a polymerizing monomer, a cross-linking monomer, and a surfactant as essential components with a water phase containing water as an essential component thereby obtaining a water in oil type high internal phase emulsion, continuously forming said emulsion, increasing by heating the temperature of the emulsion by the use of an active thermal energy ray, and polymerizing the emulsion at a curing temperature.

13. A method for the production of a porous cross-linked polymer which comprises steps of mixing an oil phase containing a polymerizing monomer, a cross-linked monomer, and a surfactant as essential components with a water phase containing water as an essential component thereby obtaining a water-in-oil type high internal phase emulsion, wherein said emulsion is formed in the shape of a film or a sheet, the rate of temperature increase of said emulsion is not less than 5° C./minute, curing time is within 30 minutes, and the amount of a polymerization initiator, which undergoes through decomposition within said polymerization time, is 0.08 to 0.5 mol % of the amount of the monomer component.

* * * * *